United States Patent [19]

Fein et al.

[11] 4,085,385

[45] Apr. 18, 1978

[54] GASEOUS LASER DEVICE WITH DAMAGE-RESISTANT CATHODE

[75] Inventors: Michael F. Fein, Toledo; Charles W. Salisbury, Rising Sun, both of Ohio

[73] Assignee: Owens-Illinois, Inc., Toledo, Ohio

[21] Appl. No.: 560,645

[22] Filed: Mar. 21, 1975

[51] Int. Cl.² .............................................. H01S 3/097
[52] U.S. Cl. ............................. 331/94.5 D; 331/94.5 G
[58] Field of Search ................... 331/94.5 D, 94.5 G, 331/94.5 P, 94.5 PE, 94.5 R; 330/4.3; 313/188, 220, 349, 217, 219

[56] References Cited

U.S. PATENT DOCUMENTS

| | | | |
|---|---|---|---|
| 2,016,437 | 10/1935 | Jones | 331/94.5 D |
| 3,815,047 | 6/1964 | Smith et al. | 331/94.5 R |
| 3,868,527 | 2/1975 | Devfies et al. | 313/220 |
| 3,916,337 | 10/1975 | Kondl et al. | 331/94.5 |

*Primary Examiner*—William L. Sikes
*Attorney, Agent, or Firm*—Donald K. Wedding

[57] ABSTRACT

There is disclosed a gaseous laser device with a novel damage-resistant cathode geometry. The device comprises an envelope, a cathode volume having at least one wall, an electrically conductive cathode within the cathode volume, a lasing gaseous volume, and an anode. The cathode comprises an electrically conductive material supported by at least one cathode wall with at least one cathode wall edge being vulnerable to gas discharge deterioration. The gas discharge erosion of at least a portion of the vulnerable cathode edge is substantially prevented by the positioning of a juxtaposed protective cover plate over the cathode edge.

10 Claims, 20 Drawing Figures

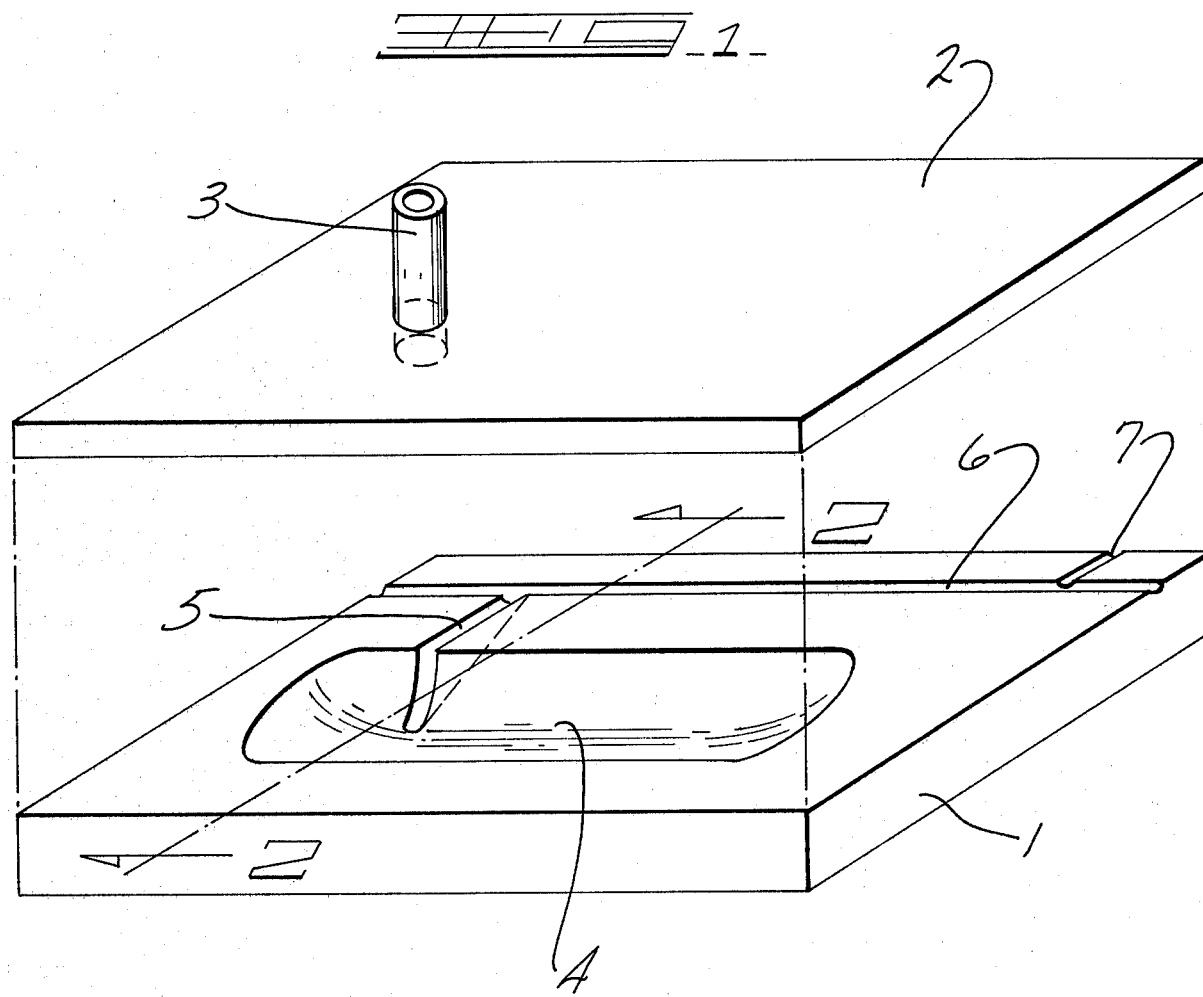
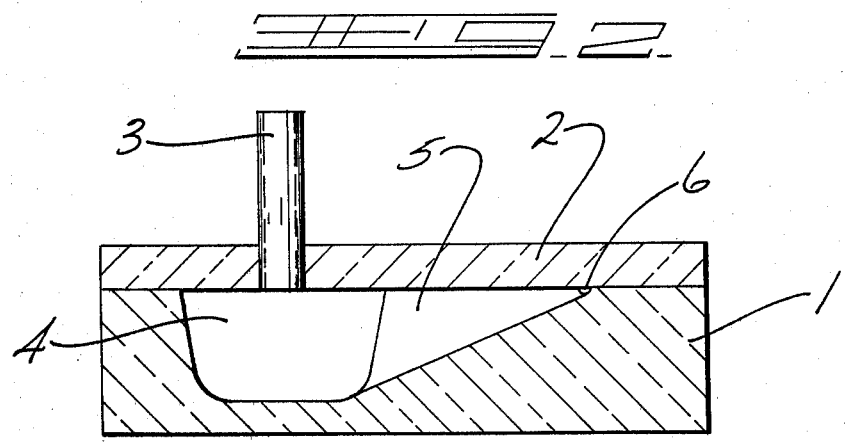

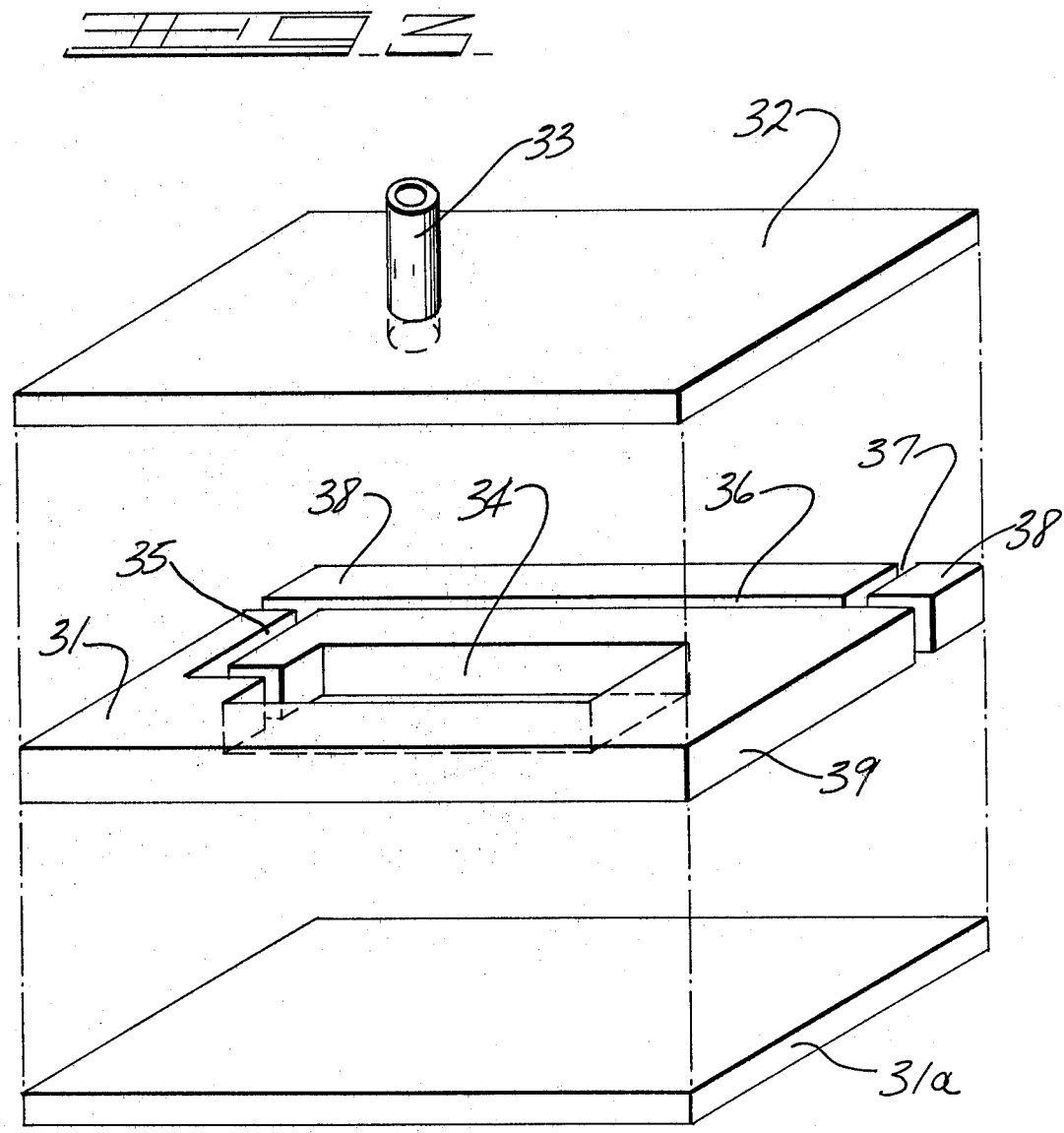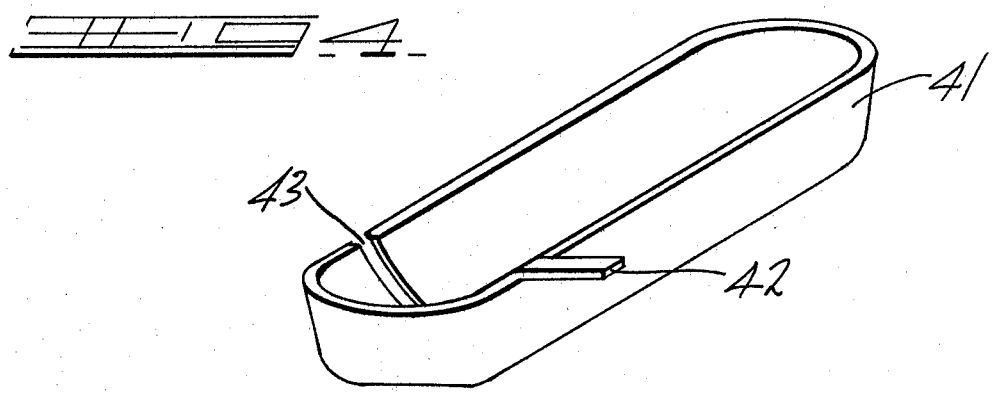

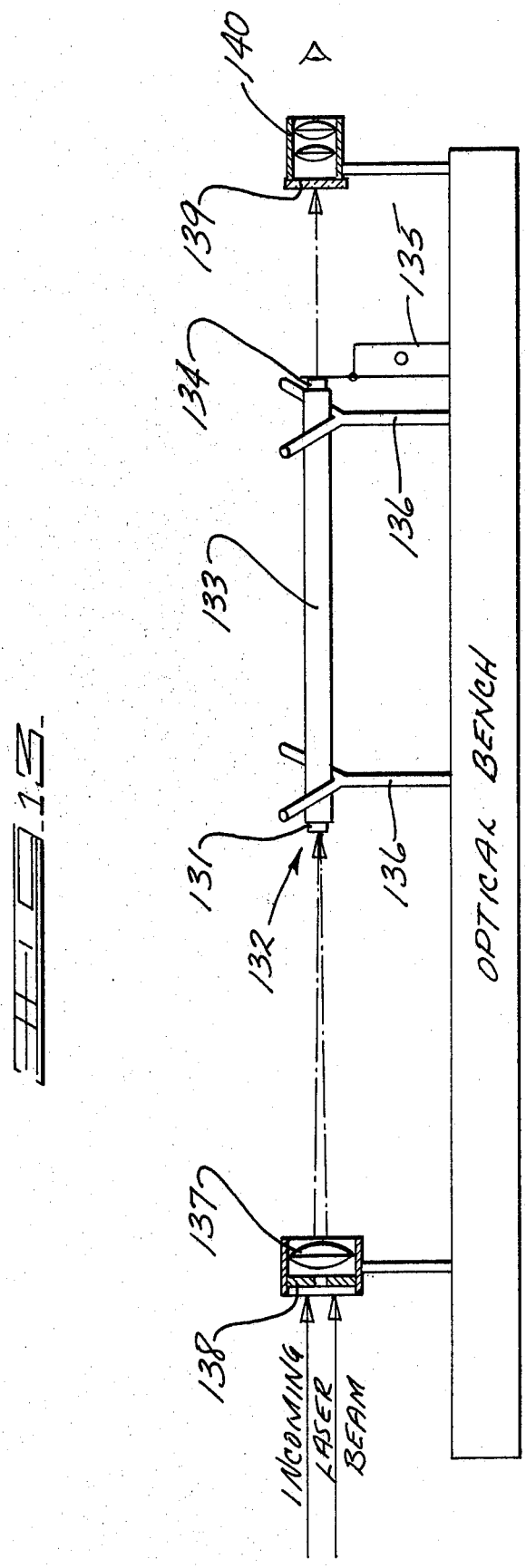

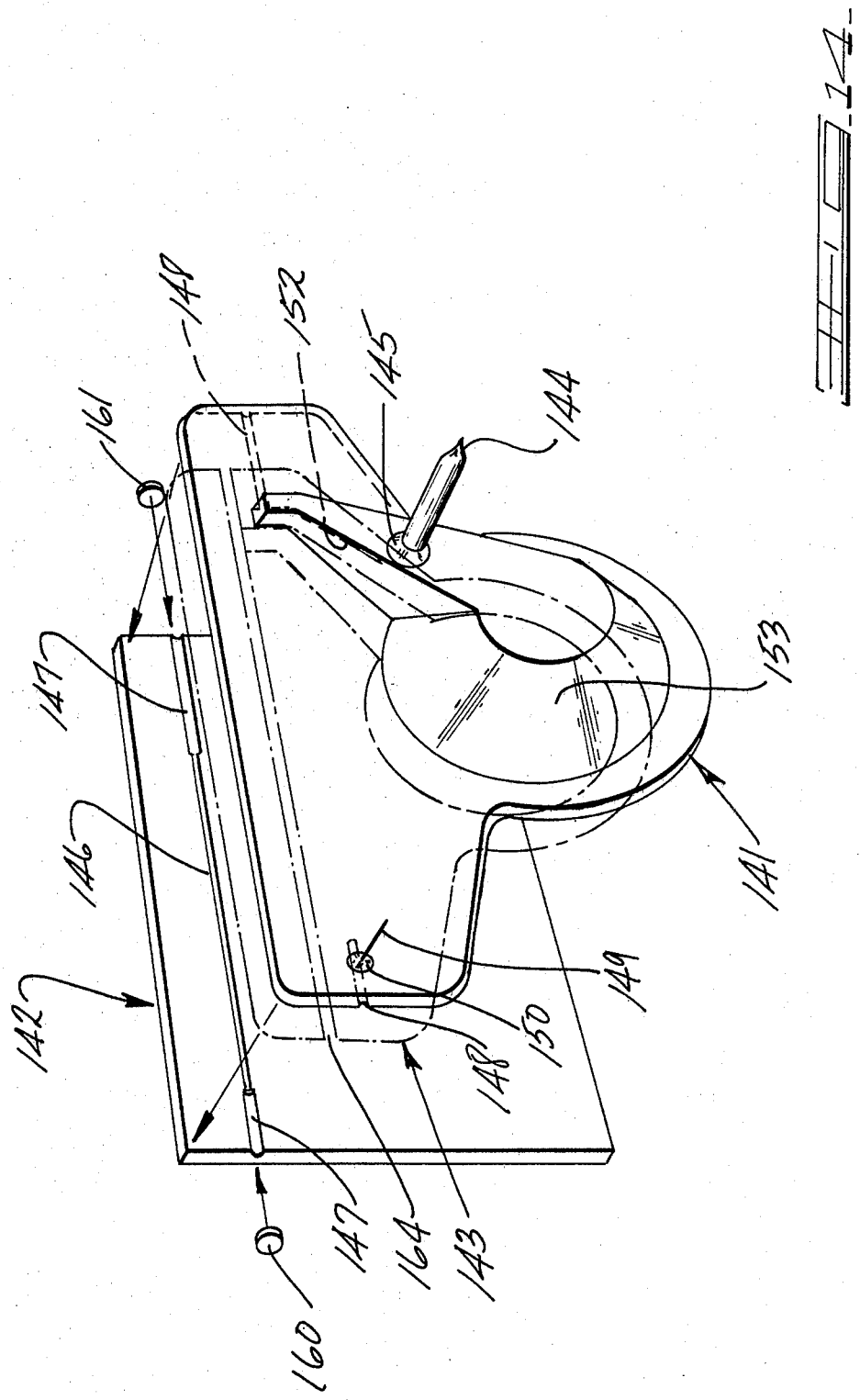

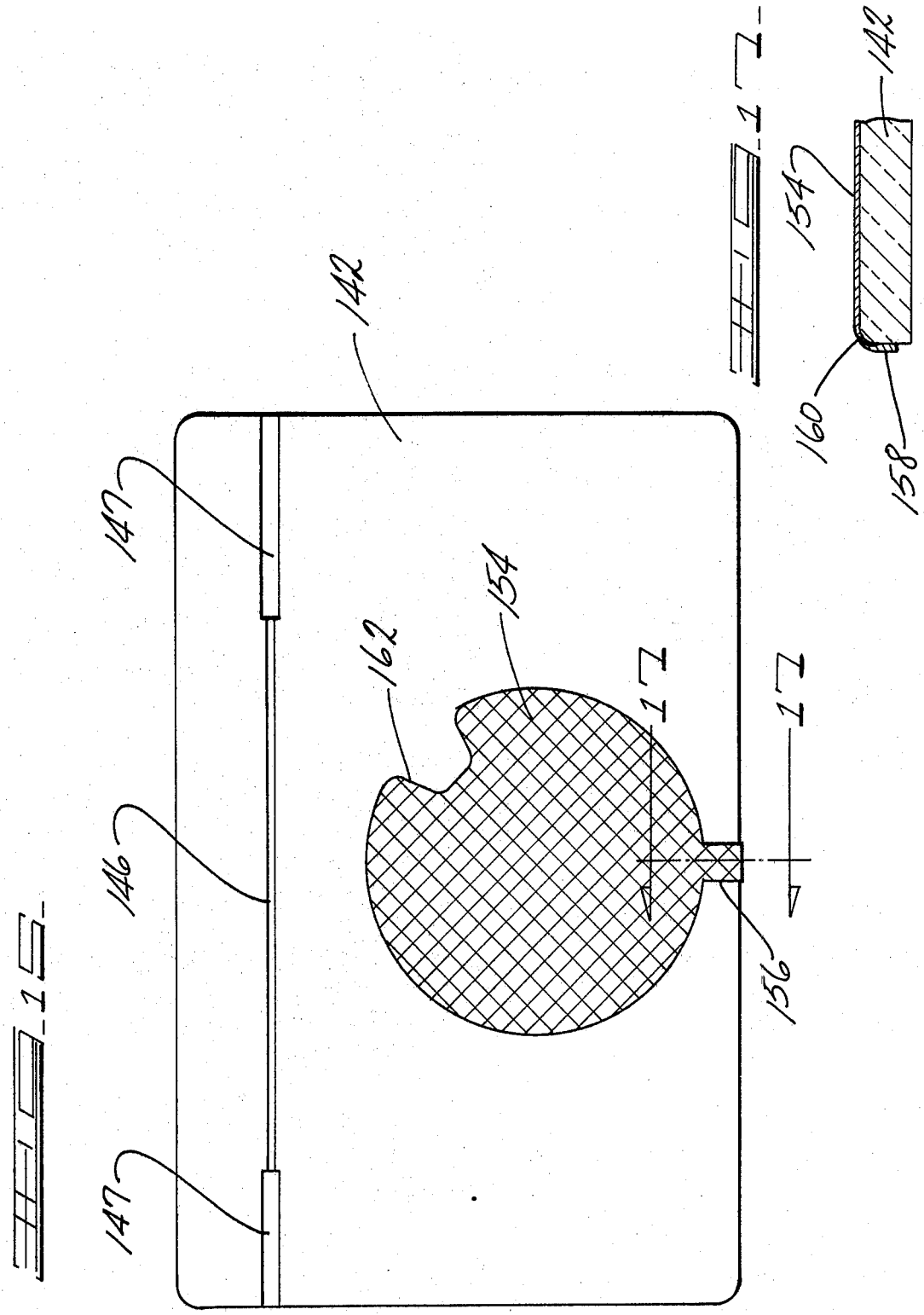

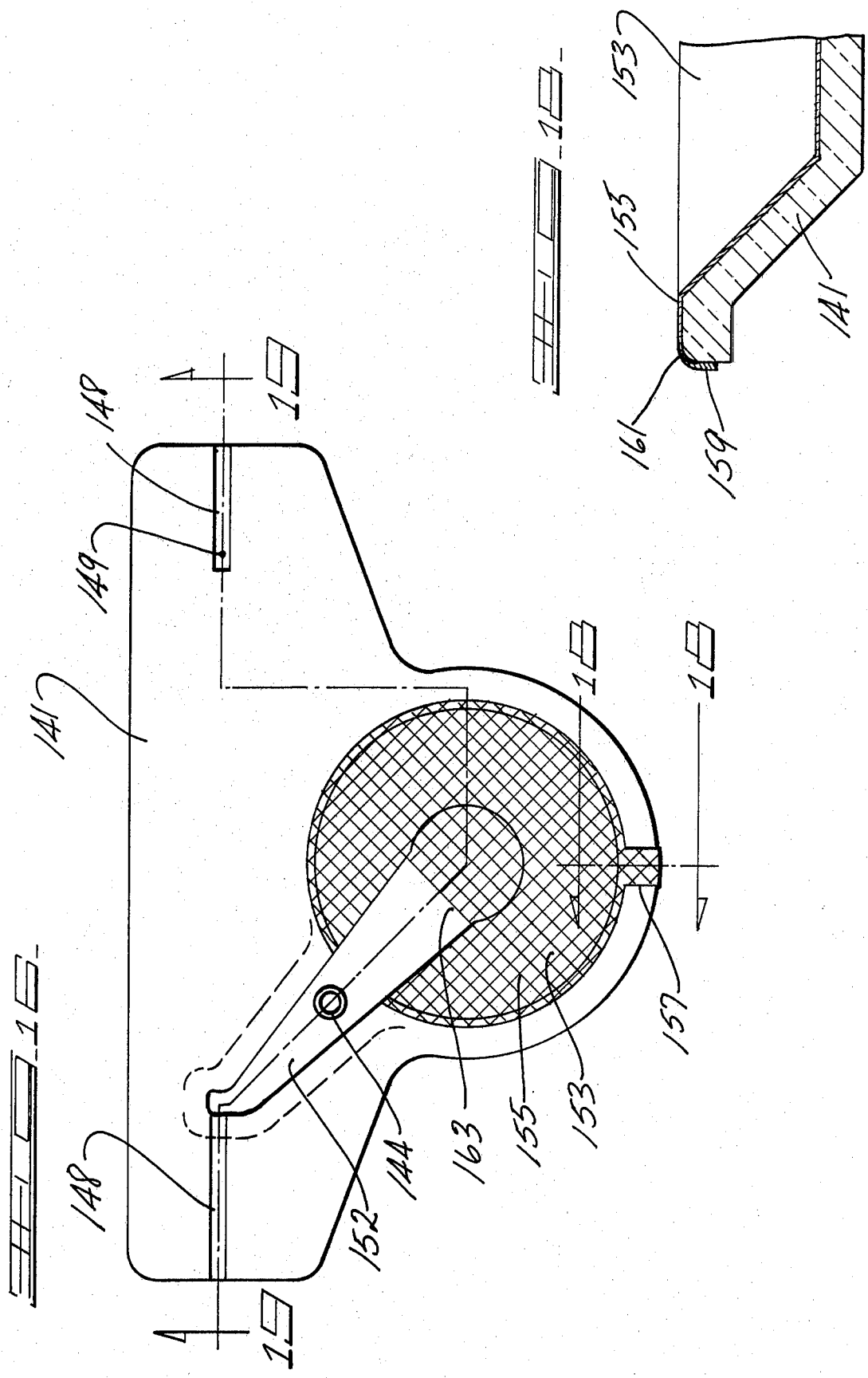

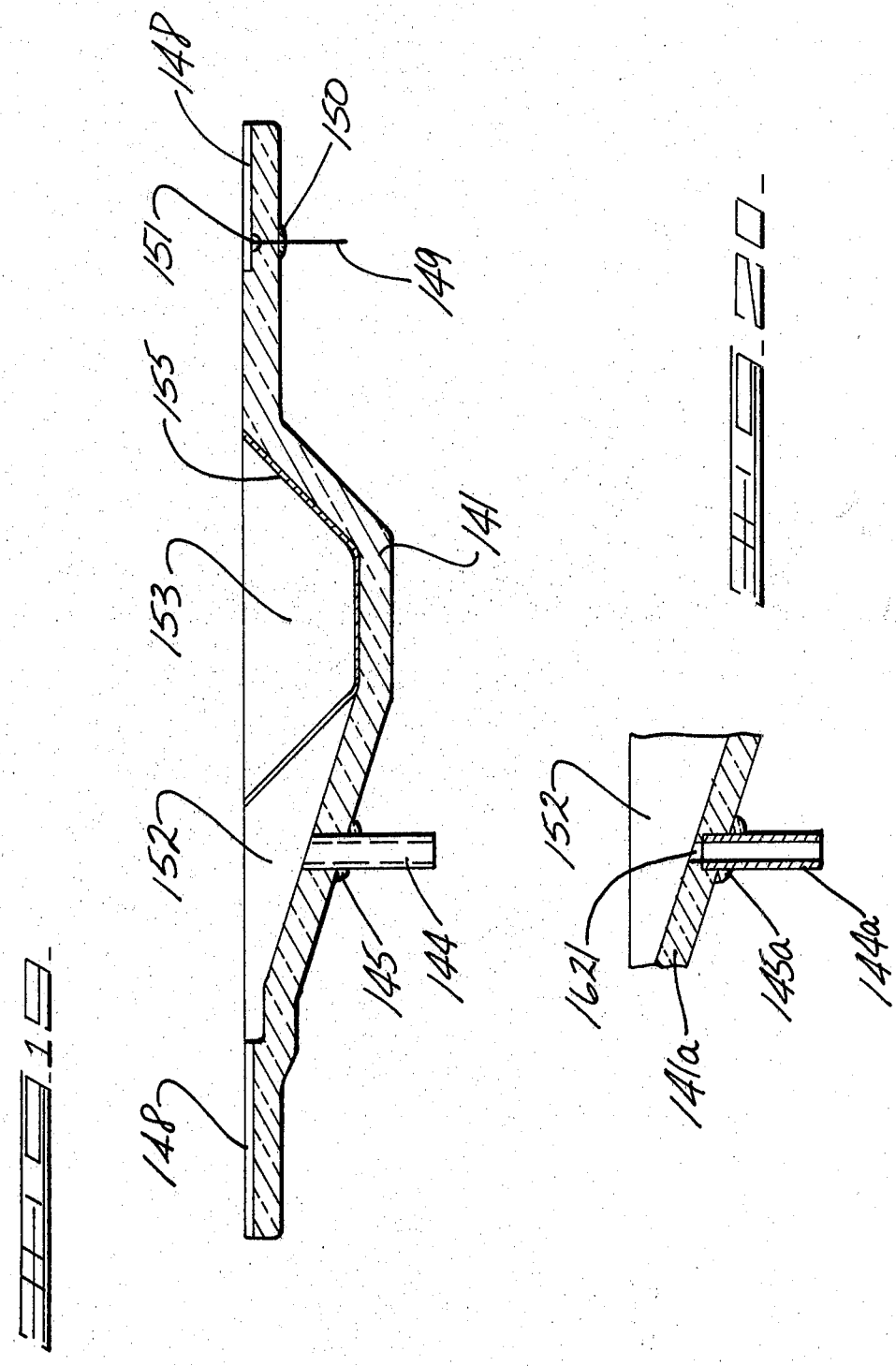

GASEOUS LASER DEVICE WITH DAMAGE-RESISTANT CATHODE

This invention relates to gas lasers. More particularly, it relates to special geometric configurations of gas lasers (especially laser envelopes) which are inexpensive to manufacture and assemble. This invention also relates to methods of manufacture, assembly, fabrication, and processing of such laser devices, including laser systems incorporating such devices.

Gas lasers are widely known in the prior art. Reference is made to U.S. Pat. No. 3,628,175, issued to J. D. Rigden and U.S. Pat. No. 3,149,290, issued to W. R. Bennett, Jr. and Ali Javan. See also Douglas C. Sinclair and W. Earl Bell, *Gas Laser Technology*, Holt, Rinehart and Wilson, c. 1969.

Typically, a gas laser comprises an elongated hollow body containing a suitable gas and two laser mirrors positioned at opposing ends of the body. Pump energy is appropriately introduced into the gas, causing a population inversion to exist therein. The existence of this inversion between laser mirrors of adequate reflectivity causes laser oscillation to develop in the gas. Alternatively, where the laser is used as an amplifier, the gas-filled body may simply be terminated by windows transparent to the wavelength to be amplified.

Many different sources of pump energy have been shown to be suitable for the initiation of laser action in gas lasers and are well known to those skilled in the art.

One important method of providing pump energy is to initiate an a.c. (alternating current) or d.c. (direct current) gas discharge in the laser gas. Another method is to illuminate the laser gas volume with electromagnetic radiation of a suitable wavelength, such as radio frequency waves, visible light, or gamma radiation. Yet another method is to initiate a suitable chemical reaction in the laser gas. Additional pumping methods are known to those skilled in the art. Most of the embodiments set forth in this disclosure will refer specifically to a gas laser embodiment in which a direct current electrical discharge is maintained in the laser gas. However, the component configurations and manufacturing methods described throughout this specification can be suitably used with a d.c. discharge in combination with any of a wide variety of pumping techniques such as radio-frequency pumping, and the use of such alternative techniques is contemplated in the practice of this invention.

A wide variety of gases may be used in gas laser construction. For example, successful gas lasers have been made with the gaseous forms of at least the following materials, separately or in mixture combination: helium, neon, argon, krypton, xenon, oxygen, mercury, cadmium, carbon dioxide, carbon monoxide, water, sodium, potassium, cesium, copper, gold, calcium, strontium, thallium, carbon, silicon, tin, lead, nitrogen, sulfur, tellurium, florine, chlorine, iodine, manganese, zinc, boron, indium, germaenium, phosphorus, arsenic, antimony, bismuth, selenium, CN, HBr, DBr, HCl, DCl, HF, DF, HD, $D_2$, $H_2$, NO, $CS_2$, HCN, DCN, $D_2O$, $H_2S$, $N_2O$, OCS, $SO_2$, $CH_3F$, $CH_3OH$, $H_2C{:}CHCl$, and $NH_3$.

One preferred gas mixture for certain applications is helium - neon, the typical composition being about 75 to 95 percent atoms of helium and 25 to 5 percent atoms of neon. One specifically contemplated composition is 87.5% atoms of helium and 12.5% atoms of neon, at a pressure of about 3 Torr.

The laser mirrors define the ends of the optically active gas volume. Laser mirrors are generally required to have very precise surface figures, typically perfect to within about 0.1 wavelength of visible light. Multiple dielectric coatings are typically provided on mirror surfaces, so as to provide very high reflectivity, generally 98.5% to 99.9% for helium-neon lasers, while permitting a small fraction of incident radiation to be transmitted with little loss. These dielectric coatings comprise a variety of materials such as silicon oxide, and titanium oxide. The technology of laser mirror production is widely known, and such mirrors are commercially available from many manufacturers, such as Spectra-Physics, of Mountain View, Calif. It is contemplated in the practice of this invention to utilize any suitable laser mirrors, with such parameters as reflectivity and radius of curvature to be determined by the nature of the laser gas and by the requirements of the specific laser use and application.

The laser mirrors must generally be precisely aligned with respect to one another and with respect to the axis of the laser bore. Typically, a perpendicular to the mirror surface at the laser bore axis must be aligned within a fraction of an arc minute of that axis. Techniques of mounting and aligning mirrors to this tolerance are well known in the art. Although there may be particular mirror mounting and alignment techniques which are unusually well-adapted to the class of laser constructions described herein, it will generally be possible to adapt to this present class of lasers any mounting or alignment technique that has been used with prior-art lasers.

As examples of two possible approaches to mirror mounting, which may be adapted for use with this invention, we cite the use of spherical mirror seats and cement (as disclosed, e.g., in U.S. Pat. No. 3,739,297) and of screw-and-spring mirror tilters (as disclosed, e.g. in U.S. Pat. No. 3,775,700). We hereby incorporate these two cited patents by reference.

The ends of the volume filled with laser gas may be terminated directly by the laser mirrors (the so-called "internal-mirror" laser), or may be terminated by vacuum-sealed optical windows, generally mounted at Brewster's angle, with the mirrors located outside the windows (the "external-mirror" laser). It is also possible to construct a laser in which one end is mirror-terminated and the other is window-terminated.

Although most of the examples given in this disclosure are stated in terms of just one of these three forms, it should be understood throughout that in almost every case any of the three would be a possible and potentially useful variant.

An important element of the construction of a gas laser tube is the method and materials used to seal or attach, to the glass or metal structure of the tube, the mirrors or Brewster windows which define the ends of the optically active discharge volume. This is typically done by means of epoxy resins. The critical requirements for the seal are:

1. It should be impervious to contaminating material such as water vapor from the outside environment;
2. It should be suitable to the processing environment, such as high temperature;
3. It should not emit a significant density of contaminating materials;
4. It should constitute a seal of adequate mechanical durability.

A material commonly used to attach laser mirrors is Varian Torr-Seal TM epoxy resin, which is applied as a thin bead around the edge of the part to be sealed. Other sealing methods and materials are known to those skilled in the art. Although certain of these methods may be particularly suitable to the class of lasers contemplated in this invention, most known mirror-sealing methods will be readily adaptable to work with these lasers.

The procedures used for manufacturing the laser device should be adequate to remove all significant impurities. These procedures typically include evacuation, possibly at an elevated temperature, and the operation of a series of cleaning gas discharges in repeated fillings of gas.

Where d.c. gas-discharge lasers are to be constructed, a cathode and an anode will be required.

Cold cathodes are typically constructed out of aluminum, magnesium, zirconium, or alloys thereof. The cathode must be prepared so as to retard sputtering. The production of a thin sputter-resistant oxide layer over the electrode may be accomplished by operating a discharge in oxygen between the cathode and an auxiliary anode as described, for example, in Section 7-3 of *Gas Laser Technology*, by Douglas C. Sinclair and W. Earl Bell (Holt, Rinehart and Winston, Inc., 1969) which is hereby incorporated by reference. Various other sorts of cold cathodes, such as the multicarbonate cathodes used in neon signs, can also be used. It is also possible to employ hot cathodes, in which thermionic emission from the cathode is a significant portion of its total emission. It is contemplated, in one embodiment of the invention herein, to operate conductive-coating cathodes of the type described as either discharge-heated or external-power-source-heated hot cathodes.

Cold cathode configurations are typically hollow. The hollow configuration is used because it tends to retard the ill effects of sputtering and resulting gas clean up, and because it produces a compact structure.

The anode may be of any suitable conductive material which can withstand the cleaning procedures normally used in high vacuum tecnology.

It is common practice, in the prior-art technology specific to helium-neon laser manufacture, to manufacture the laser cathode from a piece of aluminum tubing. There are several consequential costs in laser manufacture using such a cathode. First of all, commonly available aluminum tubing has been made by an extrusion process which leaves the surface layer fouled with materials such as lubricating oil. Steps are required to remove the impure surface. One example of a suitable procedure for removing the surface layer is machining of a fresh surface using water as a lubricant instead of cutting oil, as disclosed by U. Hochuli, et al., "Cold Cathodes for He-Ne Gas Lasers", IEEE J. Quantum Electronics QE-3, 612-614 (Nov. 1967), which is hereby incorporated by reference. Also, U.S. Pat. No. 3,614,642, which is incorporated by reference.

A second cost of using an aluminum tubular cathode is that somewhat cumbersome means must be provided to support mechanically the cathode and to connect it electrically to a power supply outside the laser envelope. For example, in U.S. Pat. No. 3,739,297, the electrical connection and mechanical support means include a pin which must be heat-sealed through a glass section, with spring clips, welded wires, and other connecting means providing electrical connections between the pin and the cathode.

Many of the tubular glass laser device shapes which are commonly made by manual flame working would be quite expensive or impossible to manufacture with conventional high-volume glass-working machinery. An example of such a shape is the common "side-arm" laser construction, in which cathode and anode are placed in extension tubes or bulbs jointed at the side of the laser capillary. A sidearm laser construction of this common sort is illustrated in FIG. 1-1 of *Gas Laser Technology*, supra.

Even the co-axial shapes which are more readily assembled on high-volume machinery (and which also have the advantage to users of being compact in construction) will tend to be somewhat costly because of the need to produce several vacuum-tight seals with relatively low strain and the requirement of assembling three, four or more tubular components with excellent coaxial alignment. Also the laser capillary tube must retain a high degree of straightness during all the heating and cooling operations which are implicit to manufacture.

In another known method of laser construction, a laser bore and channels connecting thereto are drilled into a block of fused quartz or other insulating material and separately-manufactured electrode envelopes are joined to the connecting channels. Such a laser is illustrated in H. G. van Bueren, et al, "A small and stable continuous gas laser," Physics Letters 2, 340–341 (Nov. 1, 1962) which is hereby incorporated by reference. The expense of drilling holes in glass materials may be uneconomical, especially when the depth of each hole must be long in relation to its diameter. Likewise, large scale production may not be feasible.

Another method of laser envelope construction comprises the so-called "pressed" or "flat" glass laser as disclosed in our copending U.S. patent application Ser. No. 523,609 filed Nov. 13, 1974, hereby incorporated by reference.

The envelope of a gas laser is normally constructed out of glass such as a borosilicate, e.g., Kimble KG-33. However, many other glasses may be used so long as the thermal expansion coefficient is suitable for normal manufacturing procedures and so long as the glass material itself does not contribute undesirable amounts of impurities to the gas discharge. Other materials, such as metals, plastics, ceramics, glass-ceramics, and so forth may also be utilized. Plastics and other materials having high vapor pressures have generally been used only in flowing-gas lasers, which tend to be less sensitive to impurities than are sealed-off lasers because the constant gas replenishment in a flowing-gas laser reduces impurity levels.

Throughout this disclosure frequent reference is made to the use of glass as the basic material. It is important to understand that the methods and device configuration described are in almost every case adaptable for use with machined or pressed ceramics, molded plastic, or any other insulating material, with appropriate alterations in choices of sealants, thermal processings, and the like. The nature of the necessary modifications will be apparent to those skilled in the art.

A common method of laser envelope construction has been the flame-working of tubular glass components. As example of such a laser is the "single bore tube gas laser" described in U.S. Pat. No. 3,739,297, hereby incorporated by reference. Tubular glass has the advantage of being a relatively inexpensive material, of being conveniently worked into a variety of configurations, and of being a relatively convenient material for the formation of gas-tight seals. One disadvantage of tubular glass structures is that such devices are more expensive than might be hoped when they are manufactured in large volume.

In accordance with the "pressed" glass embodiment, referred to above, there is provided a gaseous laser device comprising an envelope, a cathode, a lasing gaseous volume, and an anode, the envelope being defined by at least two opposing substrates bonded together, the cathode, lasing gaseous volume, and anode being positioned within different cavities of at least one substrate such that the cathode, lasing gaseous volume, and anode are commonly confined within the envelope in an integrally connecting relationship.

Most laser applications have involved the use of relatively small numbers of lasers. However, there have been recent advances in the art calling for relatively large numbers of lasers. One example of such an application is the video long-play record, or VLP, which is likely to require a low-power helium-neon laser attached to a large fraction of all television sets sold. Another such application is the laser-equipped point-of-sale scanner; which provides for automatic reading, by a scanned laser beam, of identifying tags on supermarket merchandise.

With these high-volume applications actually imminent, there comes to be a premium on the development of high-volume, low-cost long-lived lasers including manufacturing techniques.

It is widely believed that a major cause of failure in the gaseous lasers and decrease in effective life span is sputtering of the cathode material.

In accordance with the practice of this invention, such cathode sputtering is significantly reduced so as to extend the working life of the gaseous laser. More particularly, in accordance with this invention, the current density at the working surface of the cathode is decreased sufficiently so as to substantially retard the deleterious effects of sputtering and increase the laser life.

It is known in the prior art that a decreased current density will decrease cathode sputtering. See, for example, John P. Goldsborough, "Design of Gas Lasers", in F. T. Arechi and E. O. Schulz-Dubois, eds., *Laser Handbook, Vol. I*, North-Holland Publishing Co., 1972, at page 614. Goldsborough recommends a current density under 100 $\mu A/cm^2$ at 3 Torr, although other values have been used.

Furthermore, it has been found in a number of reported experiments that the rate of cathode material removal by sputtering in a glow discharge is proportional to a high power of current density. See, for example, pages 138-144 of G. F. Weston, *Cold Cathode Glow Discharge Tubes*, London ILIFFE Books Ltd, 1968, in which experiments are summarized showing sputtering rates proportional to the 2.5 or 3 power of current density. This text is hereby incorporated by reference.

In the practice of this invention, it has been discovered that the geometry of the cathode surface and/or cathode volume, and the geometry of the "cathode connecting volume" which connects the laser bore to the cathode volume, can be specifically designed so as to maintain the cathode current density at a level low enough to prevent excessive sputtering. Specific geometric designs are disclosed and defined hereinafter.

It is desirable, in order to hold cathode sputtering and gas cleanup to an acceptable level in helium-neon or other gas lasers, to keep the current density at the cathode surface relatively low, typically about 50 to 500 microamperes per square centimeter.

In the practice of this invention, we have discovered and disclose herein a variety of design features whose function is to maintain the current density, at every point on the cathode working surface, at a level low enough to prevent excessive sputtering.

In the specific practice of this invention, we have observed that if a given amount of current is to be distributed over a cathode of given surface area with maximal uniformity (so as to minimize the risk of rapid cathode erosion at points of high current density), then as much as possible of the surface area of the cathode should be close to the point of discharge entry.

To state this design criterion mathematically, the surface integral I should be minimized, where, given a certain total surface area $S = \oiint ds$, we define $$I = \oiint d\, ds$$

where $d$ is the distance from a surface element ds to the point of discharge entry. The center-entry position illustrated in FIG. 5 clearly meets this criterion better than does the end-entry position of FIG. 1.

In setting forth our invention, it will be useful at times to describe the gas laser not in terms of the solid physical components which make it up, but rather in terms of the volumes of space, which may be occupied by gas, vacuum, or inserted objects, that are bounded by the surfaces of the physical components of the laser envelope. There are usually several connected constituent volumes in a gas laser, each of which has one or more well-defined functions. For example, a common d.c. glow discharge laser envelope, such as that depicted in FIG. 1—1 of *Gas Laser Technology*, may be thought of as having five constituent volumes; a cathode volume, whose function is to contain the cathode electrode and the portions of the glow discharge which attach to the cathode (e.g., the negative glow and the Faraday dark space), a cathode-connecting volume whose function is to conduct the discharge from the cathode volume to the laser bore, a laser bore (defined in this case by the inner surface of a piece of capillary tubing) whose function is to contain the positive column in which laser action occurs, an anode connecting volume, and an anode volume to contain the anode electrode and the discharge segments attached thereto (e.g., the anode fall if one is present).

Other types of gas lasers may have different constituent volumes, but in most cases it will be true that several recognizably different spatial volumes enter into the laser's construction, each of these volumes having particular operational functions.

It should be understood that by constituent volumes, we do not necessarily mean spaces all of whose boundaries are defined by solid walls. For example, in the device shown in FIG. 1—1 of *Gas Laser Technology*, supra, the cathode volume is open at the point where the cathode connecting tube joins the cathode bulb. Nevertheless, it is clear to one skilled in the art that the space enclosed by the cathode bulb (and closed by an imaginary plane across the end of that bulb where the connecting tube enters) is a recognizably separate region of the laser device, having well-defined functions. It is not always a matter of universal agreement how best to conceptually divide a given laser device into constituent volumes. For example, for some purposes it might be convenient to consider the cathode volume and the cathode-connecting volume as a single unit. Nevertheless, it will be understood by those skilled in the art that most gas lasers have several recognizably-distinct constituent volumes.

Although most of the embodiments herein are stated in terms of positive-column glow-discharge, helium-neon lasers, which typically have cathode volumes, laser bore volumes, anode volumes, and one or more connecting volumes, many other varieties of lasers are contemplated to be within the scope of the invention, such lasers requiring other constituent volumes well known to those skilled in the art. For example, metal vapor lasers may include metal-storage and condensation volumes. Lasers unusually subject to gas cleanup may include gas reservoir volumes. Lasers subject to serious cataphoretic effects may include return path volumes (analogous to that illustrated in the U.S. Pat. No. 3,628,176). Getter-containing volumes might be incorporated in many different varieties of gas lasers, in order to increase resistance to contamination during long-term operation, or to reduce the purity requirements placed on the gas-filling station used in laser manufacture. Coolant-flow volumes may be provided in lasers which require the removal of excess heat.

Volumes may be provided for the insertion of optical elements, such as prisms, Brewster windows, intensity or phase modulators, gratings, apertures, lenses, detectors, etalons, beam splitters, or other mirrors additional to the two normally required in the operation of a laser.

When we refer to the envelope of a laser, we mean the gas-tight wall which defines the periphery of the constituent volumes of the laser. However, in some embodiments, the envelope is considered not to include the mirrors or windows which define the ends of the laser bore, these end terminations having to be bonded to the envelope to complete a truly gas-tight structure. Likewise, electrical feed-throughs which conduct electric current from the inside to the outside of the envelope are generally considered not to be a part of the envelope, but rather to be separate components which pass through the envelope in gas-tight fashion. In one embodiment of this invention, the envelope consists of at least two opposing electrically-insulating components which are sealed, fused, or otherwide bonded together to form a structure which, with the addition of sealed-on mirrors, becomes gas-tight.

In this invention, several basic structural embodiments, each of which is particularly suitable to high-volume manufacture, are contemplated. In one embodiment, one or more constituent volumes of the laser are incised, pressed, molded, machined, ground, etched, or otherwise defined in a single surface of a substrate. These volumes are then closed by sealing a second, flat, substrate to the incised substrate.

In a further embodiment, all or a plurality of constituent volumes of the laser are defined by the combination of depressions in the mating faces of two component substrates, neither of the mating surfaces being entirely flat. In this variation, it may be that neither of the substrates has any planar surface.

Another embodiment may be described as the "multiple-plate laser". Top and bottom surfaces of all or a plurality of this laser's constituent volumes are defined by essentially-planar surfaces of top and bottom plates. The side surfaces of these volumes are defined by one or a multiplicity of plates essentially of equal thickness, which are sealed between the top and bottom plates.

Many obvious improvements to these three approaches are possible, and more than one of them may be employed in a single device. Some of the possible variations will be suggested in this disclosure, and others will be apparent to those skilled in the art.

Reference is made to FIGS. 1 to 12 illustrating some of the best embodiments contemplated by the inventors in the practice of this invention.

In FIG. 1, there is illustrated an exploded, perspective view of a two-part, "pressed" or "flat" laser construction which may be used in the practice of this invention.

FIG. 2 is a cross-sectional view of FIG. 1.

FIG. 3 is an exploded, perspective view of a three-part laser prepared in accordance with this invention.

FIG. 4 is a perspective view of a cathode structure embodiment.

FIG. 13 is a schematic diagram of a passive alignment system which is one suitable mechanism for aligning the mirrors of lasers made in accordance with this invention.

FIG. 14 is an exploded view of one pressed-glass-laser embodiment of the present invention.

FIG. 15 is a plan view of the flat-plate component of the laser shown in FIG. 14.

FIG. 16 is a plan view of the pressed-glass component of the laser shown in FIG. 14.

FIG. 17 is a cross-section of a part of the flat-plate component shown in FIG. 15, the cross section being chosen to illustrate a means of making electrical contact to the cathode.

FIG. 18 is a cross-section of a part of the pressed-glass component shown in FIG. 16, the cross-section being chosen for the same reason as that of FIG. 17.

FIGS. 19 and 20 are cross-sections of the pressed-glass component shown in FIG. 16, along a line chosen to exhibit several geometrical details of the component.

Figure 5:
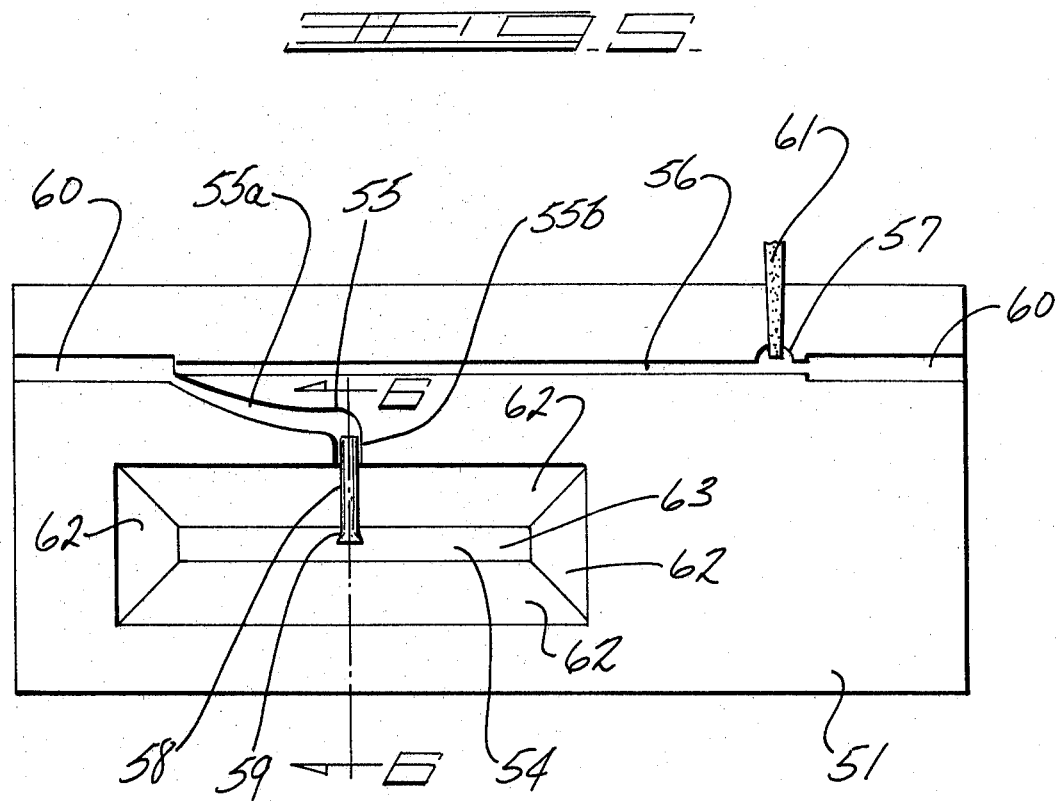
FIG. 5 is a plan view of a laser substrate having a length of tubing for insertion of the discharge into the cathode volume.

In FIG. 1, there is illustrated a substrate 1 and a cover plate 2. The cover plate 2 contains a gas processing tubulation 3. Substrate 1 contains a cathode volume 4, a connecting channel 5, a laser bore or groove 6, and an anode channel 7.

Although the gas processing tubulation 3 is shown as connecting with the cathode volume 4, it will be understood by those skilled in the art that this gas processing tubulation may be conveniently positioned anywhere in the device so as to introduce gas into the cathode volume, connecting channel, and the laser bore.

Although not shown in FIG. 1, it will be understood by those skilled in the art that a cathode will be introduced into the cathode volume area 4. Likewise, an anode will be conveniently inserted and sealed, vacuum-tight, into the anode channel 7.

In FIG. 2 there is illustrated a cross-sectional view of the entire assembled device of FIG. 1.

In FIG. 3 there is illustrated a modification of the embodiment of FIG. 1. There is shown a top cover plate 32, a center plate 31, and a bottom cover plate 31a. The top cover plate 32 contains a gas processing tubulation 33. The center plate 31 may be made up of one or more segments. It comprises a cathode volume 34, a connecting channel 35, a laser bore 35, and an anode channel 37.

The cathodes and anodes are not illustrated in any of the FIGS. 1, 2 and 3. However, it will be clearly understood by those skilled in the art that cathodes and anodes of various geometric shapes may be conveniently inserted into these devices. For example, a cathode would be inserted into the cathode volume 34 in FIG. 3 and an anode would be inserted into the anode channel 37 in FIG. 4. In actual practice, the cathode typically may be in the shape of the walls of the cathode volume 34.

In FIG. 4 there is illustrated a cathode body 41 which would generally conform to the wall shape of the cathode volume 4 in FIG. 1. The cathode 41 contains a metal spade 42 which acts as a contacting tab for connection to an outside source of electrical power. There is also illustrated an entrance hole 43 opening into a connecting channel such as illustrated in FIGS. 1, 2 and 3.

One advantage of the set of geometries contemplated in one practice of this invention is that the internal surfaces of the constituent volumes of the laser are all laid open, which facilitates cleaning during manufacture, using a variety of cleaning processes such as plasma cleaning.

Another advantage of the laying-open of internal surfaces inherent in this practice of the invention is that it facilitates coating by a variety of processes, such as vacuum evaporation, sputtering, chemical vapor deposition, ion plating, and settling from solution.

One useful application of coatings is the manufacture of laser cathodes by placing an adherent coating of conductive material on the walls of the cathode volume of the laser device. An anode electrode may be similarly manufactured.

It should, of course, be understood that the laser envelopes of this invention may be so constructed as to accept conventional electrodes, such as a metal pin anode or a hollow-tube cathode. A cathode of this general type is illustrated in FIG. 4. It is one important feature of this invention, however, that the laser envelopes described may easily be constructed so as to accept coated electrodes, a feature not shared by conventional tubular glass laser envelopes. To produce the cathode and anode electrodes, for example, a vacuum evaporation system may be used to coat the upper and lower laser substrates, through a mask, with several hundred A of chrome (to act as an adhesion layer), followed by approximately 10,000 A of aluminum. The mask restricts deposition to the regions which upon closure of the device would be the cathode and anode volumes.

Any suitable metal or metalloid or semiconductor can be utilized as the cathode or anode material including the pure forms and conductive alloys of Mg, Be, Ti, Zr, Hf, V, Nb, Ta, Cr, Mo, W, Mn, Tc, Re, Fe, Os, Rh, Ir, Ni, Pd, Pt, Cu, Ag, Au, Zn, Cd, Hg, Al, Ga, In, Si, Ge, Sn, Pb, and so forth. Preferred materials include the pure or alloy forms of Al, Ti, Be, Mg, Ni, Ta, and Zr. For successful utilization of a particular material, it may be necessary to protect the working surface with an appropriate barrier coating.

The coating of barrier material may be selected from the groups consisting of the oxides, nitrides, borides, halides, and carbides, of at least one member selected from Be, Mg, Ca, Sr, Ba, Si, Zr, Ti, Ta, Al, Ge, Sn, Bi, V, Nb, Cr, Mo, W, Mn, Tc, Re, Ru, Os, Co, Rh, Ir, Ni, Pd, Pt, and the rare earths. The rare earths are defined as the Lanthanum Series including elements Sc and Y and the Actinium Series. Likewise, the barrier coating may be at least one member selected from the group consisting of the oxides, nitrides, halides, and carbides of boron.

The term coating is intended to be all inclusive of similar terms such as films, layers, and so forth.

The barrier coating may comprise an oxidized layer of the cathode material, i.e. oxidized in situ on the surface of the cathode.

The barrier coating may also be applied by so called "thin-film" techniques such as vapor deposition, vacuum deposition, electron beam evaporation, plasma, flame, or arc spraying, ion plating, and sputtering target techniques. Likewise, combinations of such techniques may be used.

The thickness of the barrier coating typically ranges from about 10 angstrom units to about 1000 angstrom units. Multiple barrier coatings are also contemplated.

It should also be noted that "thick-film" coatings may readily be applied to the surfaces of laser components prepared in accordance with the pressed glass and multiple-plate embodiments of this invention. These are typically coatings of conductive or insulating material which are applied in slurry form, by such processes as screen printing, settling, or spraying, and then heat-processed to remove solvents and solidify the material. Thick-film coatings have previously been employed in gas lasers. See, for example, K. G. Hernquist, "Low-radiation-noise He-Ne Laser", RCA Review, Sept. 1969, pp. 429ff, hereby incorporated by reference, in which a porous alumina lining, saturated with potassium, is used to form a conductive cathode surface.

The unique feature of a thick-film coating, as used in a pressed or flat device, is that the openness and accessibility of the structure would make the application of coatings especially straightforward and economical.

An advantage of the open, easily coated structures is that passivating coatings may be easily applied to all interior surfaces. For example, it would be possible to evaporate several thousand A of alumina or silica onto all interior surfaces of the device shown in FIG. 1 prior to the application of metal layers, so as to prevent diffusion of impurities harmful to laser action out of the glass substrates. Suitable protecting materials include at least one member selected from the group consisting of the oxides, nitrides, borides, halides, and carbides of at least one member selected from Be, Mg, Ca, Sr, Ba, Si, Zr, Ti, Ta, Al, Ge, Sn, Bi, V, Nb, Cr, Mo, W, Mn, Tc, Re, Ru, Os, Co, Rh, Ir, Ni, Pd, Pt, and the rare earths. The rare earths are defined as the Lanthanum Series including elements Sc and Y and the Actinium Series. Likewise, the coating may be at least one member selected from the group consisting of the oxides, nitrides, halides, and carbides of boron.

The term coating is intended to be all inclusive of similar terms such as films, layers, and so forth.

Thin film techniques, as disclosed hereinbefore, may be used.

The thickness of the protective coating typically ranges from about 0.1 micron to about 50 microns. Multiple protective coatings are contemplated.

The use of interior coatings on laser bores has been disclosed in the prior art, for example in U.S. Pat. No. 3,394,320 to G. K. Medicus. What has not been disclosed is the application of such coatings by methods such as electron-beam evaporation, which requires a clear line of sight from a source, or the application of a passivating coating to all or some interior surfaces of a laser for the purpose of preventing emission of harmful impurities from those surfaces.

The use of such passivating layers makes it possible to consider using materials such as injection-moldable plastics to fabricate lasers, even though the relatively high vapor pressures of such materials might make them unsuitable for use without such passivating layers except in particular types of lasers such as flowing-gas lasers. If a passivating layer is constructed (perhaps in several sub-layers, including two or more different materials) to have adequately low porosity under all conditions which the laser will experience, then the substrate material will not in any way interact with the gas discharge, and any substrate material may be used whose thermal, mechanical, and electrical-insulating properties are found suitable. In fact, the substrate material might be a conductor, such as invar or aluminum, so long as adequate protective insulating layers were provided at all points to avoid the shorting-out of the gas discharge by the substrate material. An aluminum substrate heavily anodized on all surfaces might thus be suitable.

Two particular advantages of using an organic thermoplastic material to make laser envelopes are that:

1. Final alignment of the laser mirrors might be achieved by heating the plastic until it softened slightly, deforming the entire device or a part of it to obtain mirror alignment, and then permitting the plastic material to cool. A comparable method of alignment has been used with glass laser envelopes, but the high softening temperature of glasses makes this approach difficult with glass.
2. The several components of a thermoplastic laser envelope could conveniently be heat-welded to produce gas-tight bonds, thus eliminating the need for a separate sealant material.

Another example of the use of interior coatings in a pressed laser envelope is the production of conductive inserts in the laser bore to increase laser power. See, for example, Yu. G. Zakharenko and V. E. Privalov, "Oscillations in the discharge gap of He-Ne laser and their effect on the emission parameters", Opt. Spectrosc. 35, 434 ff (October 1973), hereby incorporated by reference. Zakharenko and Privalov demonstrate that the use of metal rings, spaced within the positive column of a He-Ne laser, can increase output power. The open structure makes it very economical and straightforward to provide such inserts, either by coating the walls of the bore or by dropping in separate metal tubes before sealing on the top plate. If it is desired to provide electrical contact to these rings, external connections could be manufactured by techniques such as those disclosed hereinbefore for anode and cathode connections.

Yet another possible example of the utility of interior coatings arises in the manufacture of high-current rare gas ion lasers. A common difficulty in the manufacture of such lasers is that the laser bore is rapidly eroded by the arc discharge. See, for example, William Bridges, "Materials and Techniques for Gas Lasers," Proc. 9th IEEE Conf. on Tube Techniques, 1968, pp. 117 ff, incorporated herein by reference. If the bore of such a laser is laid open, in a flat or pressed construction, it could be straightforward to apply a very durable internal coating by a process such as flame spraying or plasma spraying. The substrates to be coated could be selected for such properties as high thermal conductivity, while the coating could be selected simply on the basis of its providing maximal resistance to erosion by the arc.

Another advantage of the class of pressed or flat laser envelopes contemplated in one practice of this invention is that the flexibility and precision of laser bore manufacture can be considerably enhanced. For example, in the conventional tubular gaseous laser, in which the laser bore is a section of capillary tubing, it becomes relatively expensive to make bores much smaller than 0.040 inch in diameter, or more precisely controlled in diameter than $\pm$ 0.010 inch because of the difficulties involved in accurate control of the drawing process. In constrast, if the bore is manufactured by machining the surface of a glass plate, for example with a tungsten carbide or diamond grinding wheel of thickness slightly less than the desired bore width, it becomes straightforward to make bores at least a factor of two smaller than 0.040 inch in greatest dimension, and to control bore dimension to $\pm$ 0.001 inch or better.

One particular application of this advantage will lie in the manufacture of unusually short helium-neon lasers of relatively high power. Since the gain of these lasers is known to be inversely related to diameter, the availability of smaller diameters will make it possible to approximtely match the output powers of contemporary devices, but with a laser of shorter length.

A second application of the advantage will lie in precise control of transverse lasing modes. It is common practice to restrict lasers to desired modes of operation, e.g. $TEM_{oo}$, by controlling the size of the optically limiting aperture in the laser cavity. In many cases, the aperture is the bore itself. The availability of economical methods for precise control of bore diameter will make more economical the precise control of transverse laser modes.

The necessity of the embodiments described herein for reducing cathode current density became evident during experimentation with a laser mode according to FIG. 1. In one embodiment hereof, the cathode-connecting channel 5 of the device in FIG. 1 has a width and depth of approximately 0.15 inch at the cathode end. The cathode is of evaporated aluminum. When the device was operated for a period of hours, the cathode metallization was observed to erode seriously near the point where the connecting tube 5 entered cathode volume 4. Observations of the relative brightness of the discharge as a function of position in the cathode volume made it apparent that current density was highest near the entry point of the discharge.

Figure 6:
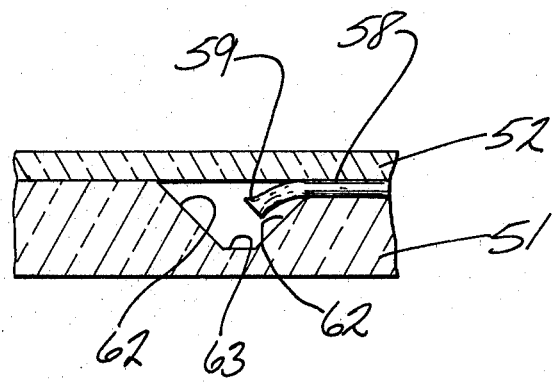
FIG. 6 is a cross section of the cathode region of a laser incorporating the substrate and insertion tube of FIG. 5.

The device illustrated in FIGS. 5 and 6 represents one embodiment of this invention utilized to reduce cathode current density to a level low enough to prevent serious cathode erosion.

There is illustrated in FIG. 5 a laser substrate 51, in which are several connected depressions: a cathode volume 54, a cathode-connecting volume 55 comprised of connecting segments 55a and 55b, a laser bore 56, and an anode volume 57. Enlarged end sections 60 are shown on the laser bore 56, these enlarged end sections providing for reduced diffraction loss and for easier alignment of the laser mirrors (not shown) when they are added to the device. The anode volume 57 is simply a small side projection on the laser bore. It is intended that the anode to be used with this particular device would be a thin foil 61 to be sealed vacuum tight between substrate 51 and a cover plate 52 (shown in FIG. 6). The enlarged space 57 permits adequate electrical contact between the anode 61 and the gas discharge, without any necessity for the anode to protrude into laser bore 56 (which protrusion could interfere with proper optical performance of the laser).

A glass insertion tube 58, which may have a flared end section 59, is sealed into the straight section 55b of the connecting channel 55, so as to conduct the gas discharge out into the heart of the cathode volume.

As can be seen in the cross-sectional view, FIG. 6, insertion tube 58 may be bent, so as to release the discharge into the cathode volume at some distance from the top wall of the cathode volume. It may also be seen in FIG. 6 that the top wall is formed by bonding a cover plate 52, similar to cover plate 2 in FIG. 1, to substrate 51.

Although a particular anode, anode volume, and cathode volume have been illustrated in FIGS. 5 and 6, it will be obvious to those in the art that other designs of these components may be used in combination with insertion tube 58 which is the essential component of this embodiment.

In the operation of the device of FIGS. 5 and 6, the gas discharge spreads out as it travels from laser bore 56 through the tapered connecting channel 55a. This channel 55a may alternatively be untapered. It then enters the cathode cavity through tube 58. The gas discharge emerges from the end 59 of tube 58 (which may be flared to aid the spreading of the discharge) and must travel some distance through the cathode volume before it strikes a metal surface, which in this example is a conductive coating on the inside walls of volume 54. This distance of travel permits the discharge current to spread considerably before it strikes the metallization. The resulting low current density is such that serious cathode erosion is no longer observed, even after more than 1800 hours of operation. Typical dimensions of one best embodiment of a successful device of the FIG. 5 type are as follows:

Cathode depth: about 0.7 inch
Cathode width: about 2 inch
Cathode length: about 6 inch
Depth and width of channel 55a:
   0.060 inch at small end
   0.25 inch at large end
Length of channel 55a: about 2 inches
Depth and width of channel 55b: about 0.25 inch
Length of channel 55b: about 0.5 inch
Length of tube 58: about 1.5 inches
Diameter of tube 58:
   about 0.25 inch outside
   about 0.15 inch inside An important feature of the successful assembly of a device according to FIG. 5 is that the sealing of tube 58 into channel section 55b must be sufficiently tight so as to prevent the gas discharge from establishing a "sneak path" between the outer wall of tube 58 and the wall of section 55b; otherwise, the discharge could flow from cathode volume 54 to connecting channel 55a without going through tube 58 at all. In the absence of such a seal, cathode erosion may occur around the location where tube 58 enters cathode volume 54. A suitable seal might be achieved by means of a heat-processed sealant such as solder glass, by means of a chemical bonding agent such as epoxy resin, by direct thermal fusion of tube 58 to channel 55b, or by any other suitable bonding means. It is also possible to achieve adequate resistance to a sneak-path discharge by manufacturing tube 58 to fit its confining walls very closely, for example within 0.002 inch or better. In such an embodiment, no sealant is required, so long as adequate means is provided to hold tube 58 in its proper position.

An important feature of the device illustrated in FIGS. 5 and 6 is that the side walls 62 of cathode volume 54 are sloped at about 45°. As a result of this slope, an evaporated conductive coating applied to the walls of the cathode cavity will be about 0.707 times as thick on the siewalls as on the bottom 63 of the cavity. In contrast, the sidewalls of the cathode cavity shown in FIGS. 1 and 2 are in some locations within a few degrees of being vertical. Unless special evaporation fixtures are used, it is difficult to coat the near-vertical side walls of cathode volume 4 in FIG. 1 to more than one-eighth of the thickness of a coating on the bottom of the cathode volume.

The 45° slope thus makes it possible to coat all of interior surfaces to a thickness adequate to provide sufficient conductivity and resistance to erosion by the discharge, without requiring the processing time to coat some of the interior surfaces to an unnecessarily great thickness.

Another important feature of the device shown in FIGS. 5 and 6 is that the discharge is brought into the cavity at a point near the cavity's center along its longest dimension. This is in contrast to the conventional point of entry into an elongated laser cathode, i.e. at one end of the cathode, as illustrated in FIG. 3, and also in FIG. 1—1 of *Gas Laser Technology*, Supra.

This side-entry design illustrated by FIG. 5 is one which would be comparatively more expensive to manufacture than the normal end-entry design, if conventional tubular laser technology were being used. However, with the integrated-manufacture techniques described in one embodiment of this invention, it is straightforward and inexpensive to enter at the center of one side of the cathode.

Figure 7:
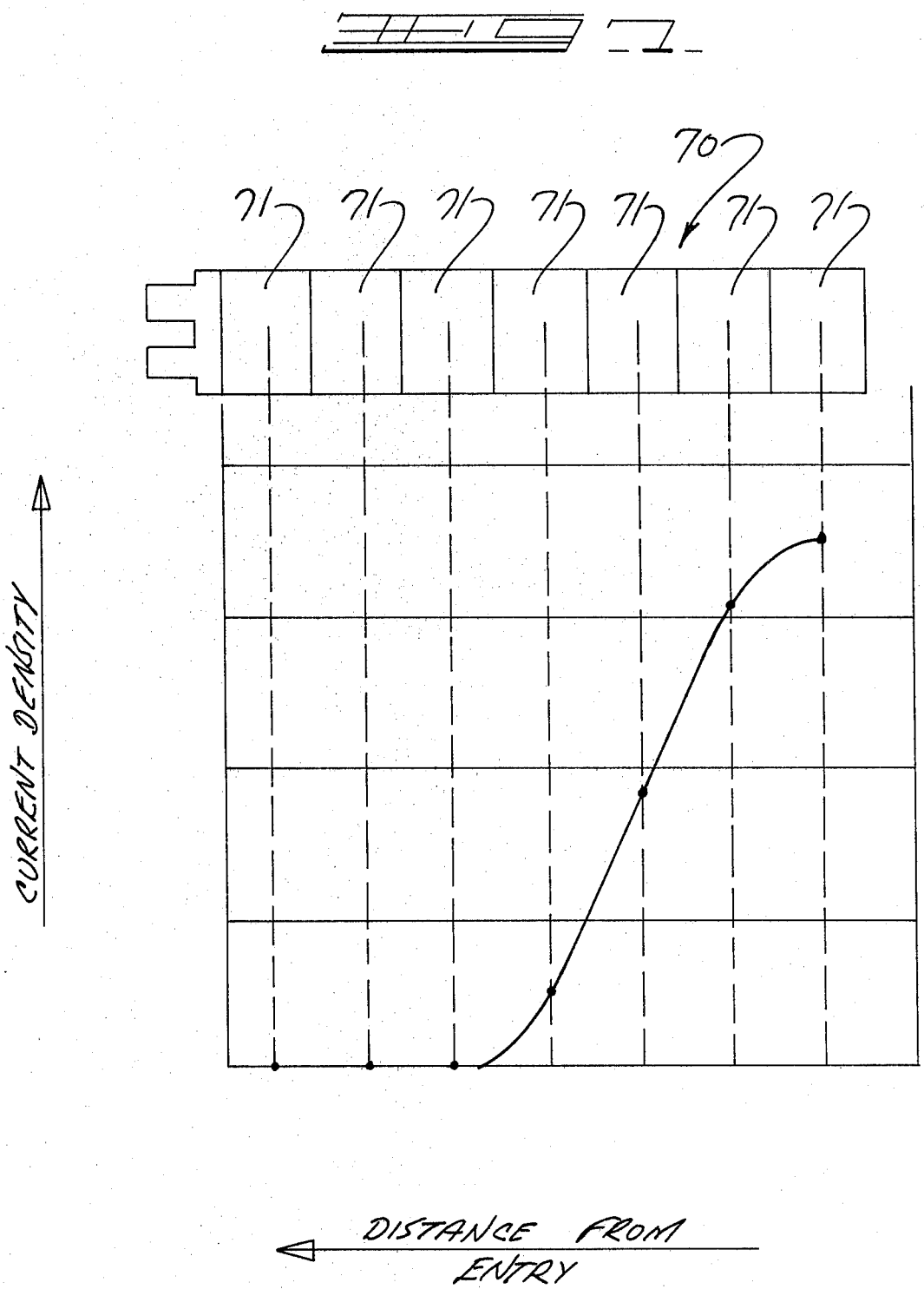
FIG. 7 is a schematic side view of a segmented tubular cathode for a laser, with an offset plot of current density versus the distance of the discharge from its point of entrance into the cathode.

The virtue of center entry may be understood by referring to FIG. 7. This figure is taken from a translated document prepared by the Foreign Technology Division of the Air Force Systems Command. The document is available from the National Technical Information Service as AD 771885. The citation of the Russian original is O. A. Boyarchikov and A. S. Shipalov, "Investigation of current distribution on the surface of a hollow cathode in a glow discharge in a mixture of helium and neon gas," Trudy Moskovskovo Energeticheskovo Instituta: Radioelektronika, Nr. 108, 1972, pp 89–91. This is hereby incorporated by reference.

FIG. 7 shows schematicallly a segmented hollow cathode 70 (comprised of multiple segments 71) for use with a helium-neon gas discharge, each of which segments 71 can be separately connected to an ammeter. The data taken with the ammeter are represented in the graph plotted at the bottom of FIG. 7. The graph shows that current density drops off rapidly with distance from the point (in this case the far right-hand end of FIG. 7) at which the discharge enters the cathode.

In FIGS. 8, 9, 10 and 11, there is illustrated a laser which achieves the purpose of keeping cathode current density to an acceptably low level, by a different method than that employed in the device of FIGS. 5 and 6. The tapered connecting tube 85, which is an essential feature of the embodiment of FIGS. 8 to 11, can be seen to be economical to manufacture primarily because of the innovative techniques of manufacture contemplated in this invention.

Figure 8:
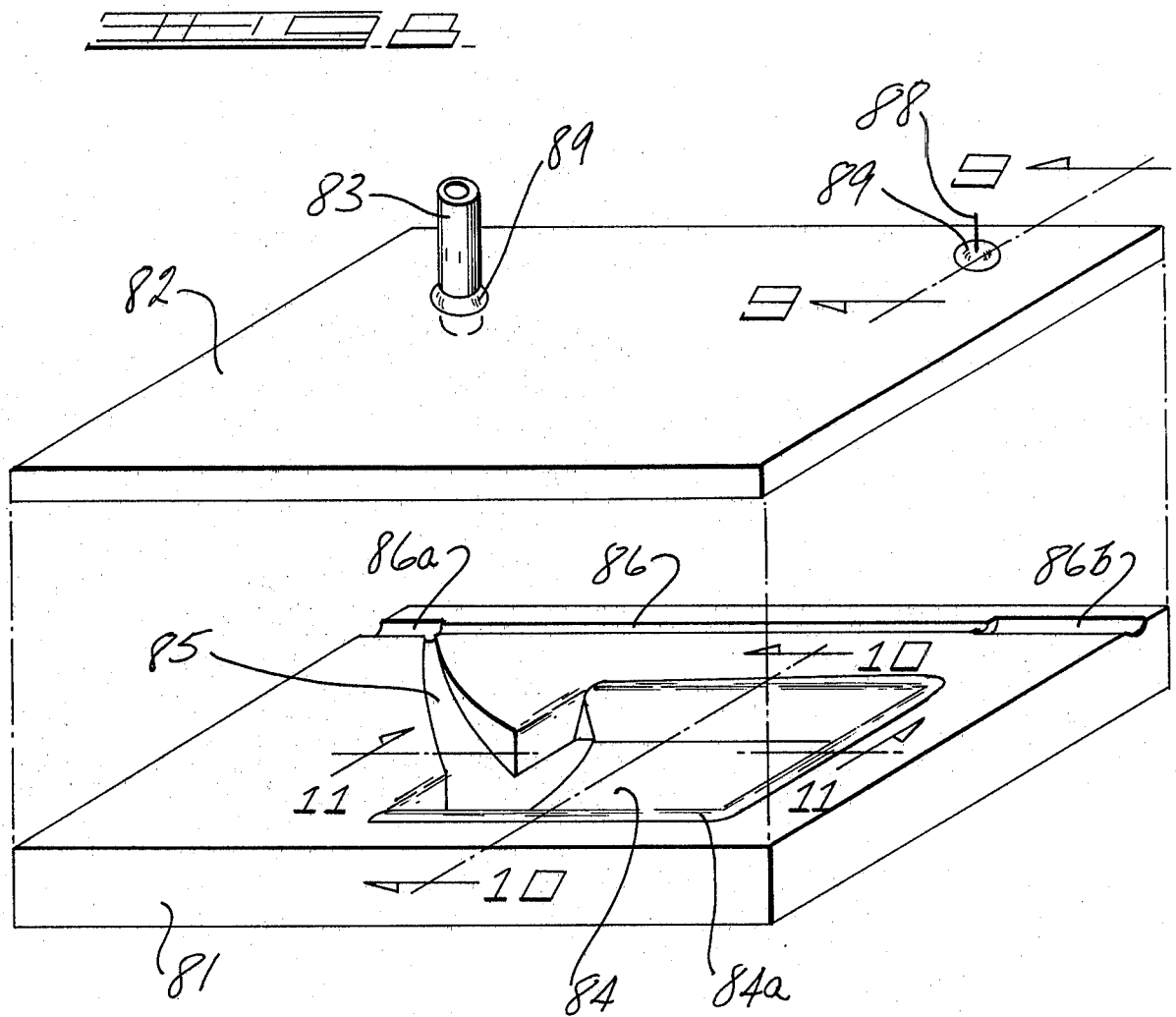
FIG. 8 is an exploded view of a laser envelope. It is similar to FIG. 1 and incorporates the tapering connecting channel as required by one embodiment of this invention.
Figure 9:
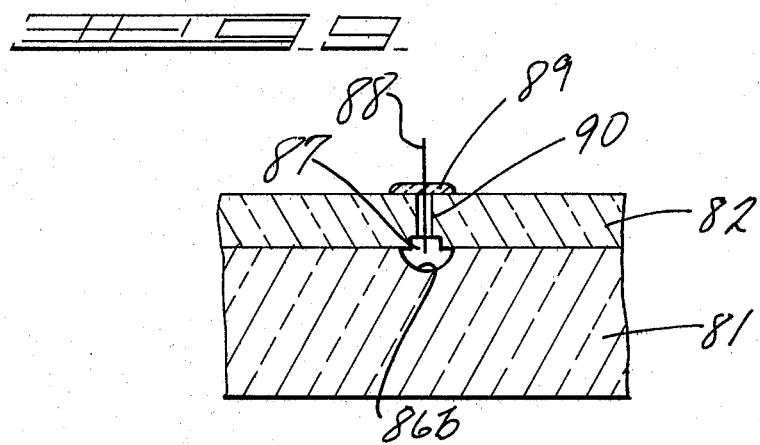
FIG. 9 is a cross-sectional view of the anode region of the FIG. 8 device.
Figure 10:
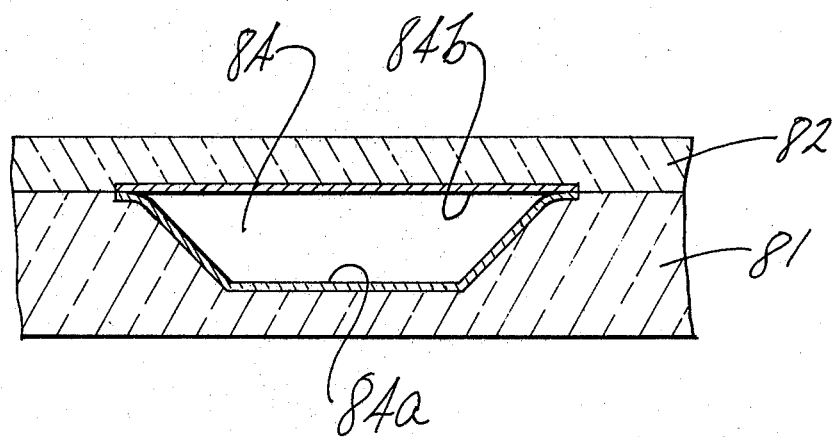
FIG. 10 is a cross-sectional view of the cathode region of the FIG. 8 device.
Figure 11:
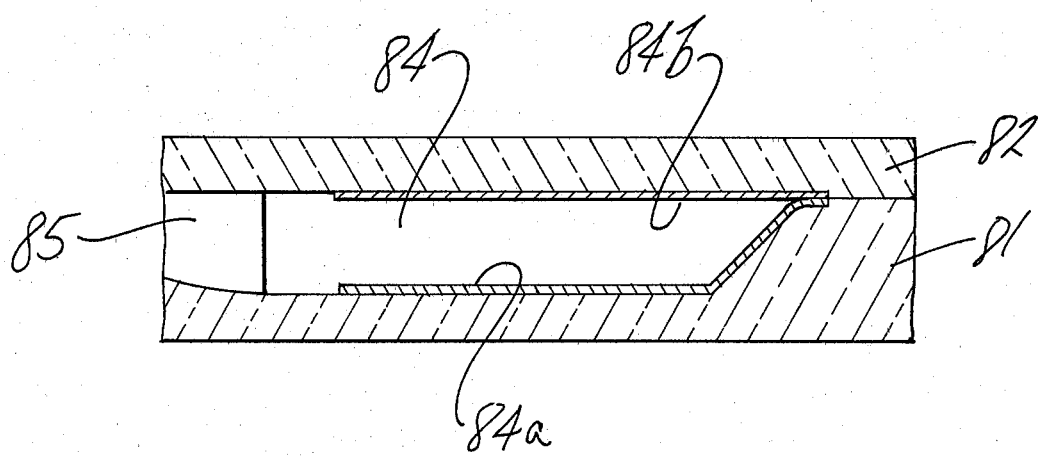
FIG. 11 is a different cross-sectional view of the cathode region of the FIG. 8 device.

In FIG. 8, there is illustrated a substrate 81 with a cover plate 82. The cover plate contains a gas processing tubulation 83, and an anode pin 88. Tubulation 83 and anode pin 88 are sealed vacuum-tight through cover plate 82 by means of solder glass beads 89. Substrate 81 contains a cathode volume 84 having a conductive coating 84a over a portion of its surface. An alternative embodiment could easily use a preformed insert cathode, such as that illustrated in FIG. 4. That portion of cover plate 82 which overlies and completes the boundary of volume 84 may optionally have a conductive coating 84b (as illustrated in FIG. 11). It is understood that means are to be provided to electrically connect coatings 84a and 84b to the negative terminal of a power supply. It is essential that the least dimension of volume 84 (i.e. the smallest of length, width, and depth) be great enough to avoid undue concentration of current in the vicinity of the discharge entrance. For common helium-neon lasers, this dimension should be at least about 1 cm.

Substrate 81 also contains a connecting channel 85, having the characteristic that it tapers in both depth and width so that at its end proximate the cathode volume 84, its depth and width are comparable to the depth of cathode volume 84. This may be on the order of 2 centimeters (cm). At its opposite end the connecting channel has depth and width substantially smaller, for example, between 1mm and 1 cm. Although the cross section of channel 85 is shown to be substantially rectangular, it may have any other convenient cross-section, such as trapezoidal or semicircular, so long as the ratio of depth to width is in the range between about 0.5 and about 2 at the channel's larger end. Considerably more difference between depth and width is permissible at the smaller end of channel 85.

The limitation of the ratio of depth to width at the larger end of the channel has been found helpful in avoiding noise in the laser output. If the ratio of larger dimension to smaller dimension is permitted to become excessive, it has been found that the discharge will often contract to a diameter comparable to the smaller dimension, and that the position of the discharge within the channel may then become unstable. The physical motion of the discharge within the channel then leads to laser noise. On the other hand, by keeping the ratio of width to depth within the stated range, it has been found possible to ensure that the discharge spreads smoothly to fill nearly the entire cross section of the channel, and that therefore no positional instability is possible.

The length of channel 85 must be great enough to permit the discharge to spread smoothly from a small diameter at one end of channel 85 (proximate bore 86) to a larger diameter at the opposite end (proximate cathode volume 84). A typical length of channel 85 may be about 1 to 10 cm, with a particularly preferred length being about 5 to 8 cm.

It will, in general, be desirable to keep channel 85 as short as possible, consistent with the requirement of smooth spreading of the discharge, since a shorter channel will tend to reduce the required starting and operating voltages of the laser.

The innovative manufacturing processes contemplated in this invention are clearly such as to permit many variations in the geometry of channel 85. For example, although in FIGS. 8 and 11, the bottom of channel 85, at its end proximate cathode volume 84, is shown to be level with the bottom of channel 84, it is permissible for there to be a small difference in these levels, so that a step would occur of perhaps 1-2mm in passing from one to the other.

Although in FIG. 8 the path of channel 84 is shown to be a simple curve, it would also be permissible to have more complex paths, so long as the cross section of the channel monotonically increases from one end to the other.

A further variation is an increase of the cross section of channel 85 in a series of steps. The criterior of the maximumm permissible step size is that it must be small enough to cause no significant instability in the discharge, since instabilities are in general a source of noise in the laser output. The exact permissible step size will vary with gas mixture and pressure, although with common helium-neon lasers it may be assumed to be less than about one centimeter.

Although FIG. 8 shows the tapered channel 85 entering cathode volume 84 at one end, other configurations are obviously possible. In one particularly desirable embodiment, the tapered channel enters approximately at the center of the long side of a generally rectangular cathode volume, the entry position being similar to that shown in FIG. 5.

An important feature of the device illustrated in FIGS. 8, 9, 10 and 11 is that those walls of the cathode volume 84 which are to be metallized are tilted as far from the vertical as considerations of space make practical. The unmetallized end wall of volume 84 is within a few degrees of vertical.

The edge of the metallization 84a, proximate the discharge entry, is generally curved concavely with respect to the discharge entry, so that as the discharge emerges from tapered channel 85 it can tend to spread out to fill the cross-section of volume 84 before striking the edge of the metallization. This design feature tends to reduce the density of current striking the metallization, thus prolonging device life.

Substrate 81 also contains laser bore 86, having enlarged end sections 86a and 86b, the enlargement of these end sections providing for reduced diffraction loss and for greater ease of alignment of the mirrors (not shown). It will be understood that these mirrors are added for completion of the device.

With respect to anode volume 87 in this particular device, the anode volume is an indentation in cover plate 82, which may be provided, for example, by grinding or pressing. Anode pin 88 projects into volume 87, the space around the pin in volume 87 being sufficient for the discharge to have good electrical contact with pin 88, with no substantially adverse voltage drops or instabilities.

It is important to the optical performance of the laser, that unless anode pin 88 is specifically intended to have a role in transverse mode selection, it does not protrude significantly into the cross-section of laser bore 86, or at least that it does not protrude into that part of the cross-section in which substantial laser oscillation is occurring.

Figure 12:
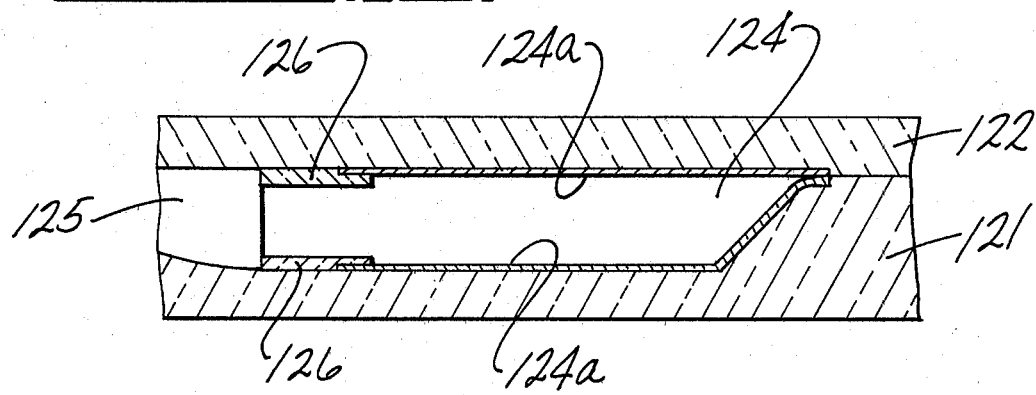
FIG. 12 is a cross-sectional view of a modified cathode region similar to that illustrated in FIG. 11.

FIG. 12 illustrates another important technique for protection of cathodes from excessive current density. FIG. 12 is a cross-section, similar to FIG. 11, of the cathode region of a device similar to that of FIG. 8. There are illustrated substrate 121 and cover plate 122 forming the boundaries of cathode volume 124 and connecting channel 125. Conductive coatings 124a, whose thickness is exaggerated for clarity, are applied to the walls of volume 124, and constitute the cathode.

It is well known in the art of manufacturing conventional sheet-metal laser cathodes that the edges of such cathodes tend to be particularly vulnerable to erosion, because they are points of field concentration. Various stratagems are known for the protection of these edges. FIG. 12 illustrates an innovative and elegant approach to edge protection, which is particularly suitable for use with the innovative manufacturing methods described herein. The figure shows an insulating layer 126, which may be any sputter-resistant material, such as silica, magnesia, alumina, or ytterbia, (or the barrier or protective coatings listed hereinbefore) which is applied to the edges of metallization 124a before cover plate 122 and substrate 121 are assembled.

Solder glasses or low temperature sealing glasses may also be used as the protective coating. Example of such solder glasses include those disclosed in U.S. Pat. Nos. 3,127,278 and Re. 25,791, both of which are incorporated by reference.

A typical solder glass which may be used comprises 65 to 80 per cent by weight PbO, 5 to 21 percent by weight $B_2O_3$, 0.5 to 15 percent by weight ZnO, 0.5 to 10 percent by weight CuO, 0 to 6 percent by weight $SiO_2$, 0 to 5 percent by weight AgO, 0 to 10 percent by weight CdO, and 0 and 5 percent by weight $Al_2O_3$.

The term coating is intended to be all inclusive of such terms as film, layer, and so forth. The insulating layer may be formed in situ oxidized on the surface of the cathode. The same wide variety of coating techniques is available for producing layer 126 as for producing the cathode itself, layer 124a.

In particular, layer 126 may be deposited by so-called "thin-film" techniques as disclosed hereinbefore, such as sputtering or evaporation, or it may be deposited by "thick-film" techniques, as would be the case if layer 126 were produced by the screen-printing of a layer of solder-glass and heat-processing it to produce a continuous insulating layer.

Alternatively, 126 may represent a solid preformed insert of insulating material, which is placed in position during device assembly, and retained in position by the geometric design of cavity 124, by suitable adhesives, or by suitable mechanical clips.

The thickness of the insulating layer typically ranges from about 0.1 micron to about 50 microns.

Another technique for protection of cathode edges is illustrated in FIGS. 8, 10, 11, and 12. The metallization 84a, 84b, and 124a are carried up over the edges of the cathode cavities 84 and 124, so that much of the perimeter of the metallization is sealed between the laser substances, and therefore cannot be touched by the gas discharge. The cavity edges over which the metallizations pass are assumed to be suitably rounded, so that electrical conductivity is maintained across the edge, and so that the edge does not become a locus of intensified current.

Yet another protection technique, which is particularly advantageous when practiced with the pressed-glass laser embodiment, is to reduce cathode current density by eliminating the usually-employed hollow cathode configuration. This technique may be practiced, for example, by constructing a laser according to FIGS. 8, 9, 10, and 11, but eliminating either the upper metallization 84b or the lower metallization 84a. The cathode volume would be correspondingly enlarged, so that the total metallized area, and hence the average current density, would be unchanged.

The advantage of this technique may be understood by reference to FIG. 7. It may be seen in FIG. 7 that in a conventional hollow cylindrical cathode the current tends to concentrate near the discharge entrance. In particular, the current density near the entrance may be expected to be higher than the so-called "normal" current density, $j_n$, which would be observed with an essentially-infinite planar cathode. This is the well-known "hollow-cathode effect". See, for example, Weston, supra., pp. 107-113. By switching to an essentially-planar cathode we may eliminate this current-concentrating effect and enhance the uniformity of distribution of current.

In conventional tubular lasers it would be cumbersome to provide an essentially-planar cathode within sufficient surface area, and with suitable protection to prevent any of the edges of the cathode from becoming points of current concentration. The edge-protection schemes illustrated in FIGS. 8 through 12 make it very straightforward and economical to protect the cathode edges, so that the combination of a pressed-glass envelope with an essentially planar cathode is uniquely suitable for maintaining cathode current density at a uniformly low level.

It must be understood that the advantage gained by eliminating the hollow-cathode effect will to some extent be offset by the loss of one well-known anti-sputtering effect of hollow cathodes, which is that such material as does sputter from the surface of a hollow cathode may easily be redeposited elsewhere on the surface of the cathode. There may still, therefore, be particular combinations of current, pressure, and gas filling, at which the hollow cathode can be shown to present a net advantage in reducing sputtering.

As one example of a mirror mounting and alignment system suitable for use with the lasers described herein, we refer to the "Passive Alignment System" illustrated in FIG. 13. It will be clear to those skilled in the art that, although FIG. 13 illustrates a capillary-tube laser, the mounting and alignment method and device described are adaptable to many other forms of lasers, such as the pressed-glass lasers described herein, by appropriate changes in fixturing.

Prior to placing the laser envelope on the passive alignment station shown in FIG. 13, a first mirror 131 (typically a near-100%-reflective flat mirror) is mounted on the back end 132 of laser bore 133. Mirror 131 is aligned and mounted nearly perpendicular to the axis of laser bore 133 by methods well known in the art, such as viewing mirror 131 with an autocallimator aligned to the axis of bore 133.

The purpose of the passive alignment system is to permit alignment of the second mirror 134 (typically a spherical output coupler) relative to the first mirror 132 so as to produce the necessary optical resonator without the need to evacuate, backfill with gas and maintain a plasma within the device. The resonator is formed with atmospheric-pressure air in the bore of the device. This is particularly desirable when solder glass is used to attach the mirrors. If the tube were evacuated when the solder glass-vehicle mixture was applied, severe gas and mirror contamination by the solder glass and vehicle could result.

The laser tube 133, with the first mirror attached to the back end 132 and perpendicular to the bore 133, is set up in two adjustable metal support vees 136 on an optical bench. One vee is near each end. The first mirror is positioned at the focal point of a lens 37 whose focal length is comparable to the length of bore 133, and may typically be 30 centimeters (cm) in length. A beam from a frequency modulated laser, typically a Spectra-Physics model 125 laser with $f = \pm 40$ MHz is passed through an aperture 138 (typically 1.5 mm) and illuminates the center of lens 137. The resulting focal spot falls on the first mirror of the laser device being worked on. A thin white diffuser (not shown) is placed over this mirror between the mirror and the lens and the operator looks down the bore of tube 133 toward the illuminating laser, while adjusting the lateral and vertical position of the mirror end 132 of the tube. When the operator sees the small bright spot on the diffuser centered in the end of the tube, he knows the beam is entering the center of the mirror end 132 of the tube. The diffuser is then removed.

A ground glass 139 with magnifier 140 is placed about 8 inches from the open end of tube 133 and the operator looks into this while adjusting the vertical and lateral position of the open end of the tube. When he sees a pattern of maximum symmetry, he knows that the fraction of the illuminating beam that leaks through the first mirror is now going down the center of the bore.

The second mirror 134 is then placed on the open end of tube 133 and is held in place and also moved vertically and laterally over the flat tube end by micromanipulator 135. As the mirror is moved about, a position can be found where the tube-mirror combination transmits light quite strongly. This is the desired Fabry-Perot resonance condition necessary for laser operation. After peaking up this resonance, solder glass or epoxy is applied. This material is allowed to dry or harden while micromanipulator 135 holds mirror 134 in place.

Use of a frequency-modulated illuminating laser greatly facilitates passive alignment. Without frequency modulation, one has to wait for coincidence of a longitudinal mode of the illuminating laser with a longitudinal mode of the resonator under construction. The resultant flashing makes it very difficult to know if an increase in brightness is due to some adjustment made or to a mode coincidence. The illuminating laser is frequency-modulated with a peak-to-peak frequency sweep approximately equal to its longitudinal mode spacing. It is modulated at a frequency high enough so that to the eye the momentary mode coincidences look continuous.

Lasers made according to this invention may be energized by any convenient means, typically with a direct current applied to the cathode and anode in excess of 1500 volts. The voltage may have to be in excess of 3000 volts in order to start the laser. An operating voltage of 2000 is typical. Ballast resistors in excess of 100,000 ohms are generally used between power source and the anode. The cathode is generally grounded.

A particular laser construction which may embody the present invention is illustrated in FIGS. 14, 15, 16, 17, 18, 19, and 20. The envelope of this laser is assembled from a pressed-glass component 141 and a flat-plate component 142. These two components are bonded together in gas-tight fashion by a layer of solder glass 143. A gas-filling tubulation 144 is sealed by a solder glass bead 145 into a hole in one of the glass parts 142 and 141, so as to permit the connection of the laser to a processing station.

A laser bore 146 with enlarged end sections 147 is defined in flat-plate component 142. Opposite the enlarged end sections 147 are mating depressions 148 in pressed part 141.

Anode pin 149 is sealed by a solder-glass bead 150 into a hole in pressed part 141. An anode cavity 151 may be provided, so that anode 149 has space in which to make electrical contact with the gas discharge in the operating laser without obstructing the laser beam.

A connecting channel 152 is provided, to conduct the gas discharge from laser bore 146 to cathode volume 153. Connecting channel 152 has an essentially trapezoidal cross-section, and increases monotonically in cross section from its end proximate laser bore 146 to its end proximate cathode volume 153.

Cathode volume 153 has generally the shape of a frustum of a cone (a so-called "frusto-conical" shape).

A thin-film metallization is applied to at least one of the surfaces defining the cathode volume. This metallization is indicated as cross-hatched areas 154 on flat plate 142 and 155 on pressed part 141. This metallization may, in one embodiment, consist of an adhesion layer of several hundred angstrom units of chromium, overlayed by approximately 30,000 angstrom units of aluminum. The metallized regions 154 and 155 have tab-shaped extensions, 156 and 157 respectively, which provide electrical connection between the metallized regions inside the laser and a power supply outside the laser. These metallized tabs 156 and 157 may be created by the same evaporation or sputtering process (for example) as that which is used to create the rest of metallizations 154 and 155.

After this deposition process, additional conductive layers 158 and 159 may be added. These layers, which may be a conductive silver-loaded paint, can be used to provide large conductive-pad areas on the outer surface of the laser, to facilitate connection of a power supply.

The metallized and conductive regions 154, 155, 156, 157, 158, and 159 are now shown in the exploded view of FIG. 14, but it should be understood that they are included in the fully-assembled device.

The completed device also includes laser mirrors 160 and 161, which are understood to be bonded in gas-tight fashion over the ends of the laser bore, for example be means of beads of epoxy resin or solder glass (not shown).

It should be noted that solder glass layer 143 is discontinuous, so as to reduce the area of contact between the gas discharge and the solder glass. The regions over laser bore 146, connecting channel 152, and cathode volume 153 are generally designed to be free of solder glass, so as to minimize contact between the active gas discharge and the solder glass. This has been found usually to be necessary in order to avoid electrolysis or decomposition of the solder glass by contact with the gas discharge.

The edges of metallized areas 154 and 155 are generally carried past the edges of cathode cavity 153, in a fashion analogous to that illustrated in FIG. 11, so as to protect these edges from gas discharge erosion.

Exposed edges 162 and 163 of the metallized regions may optionally be protected by the use of insulating materials, as shown in FIG. 12.

A wide variety of manufacturing techniques is available for the construction of the laser shown in FIGS. 14 through 19, and it should be understood that we do not wish to be bound to any specific set of such techniques. We will now describe, however, a particular sequence of manufacturing techniques which has been found especially favorable for the construction of this device.

Flat plate 142 is first cut approximately to its finished size from a plate of commercially available "plate" or "float" glass approximately ¼ inch thick. Typical dimensions may be about 8¾ inches in length (direction parallel to laser bore 146) by about 5⅝ inches in width. A specifically contemplated alternative is that this plate may be cast or pressed approximately to final size, from a gob of hot glass, rather than being cut from sheet stock.

The edges of plate 142 are then ground, or acid-polished by well-known, methods so as to remove any surface defects which might lead to later breakage.

Pressed part 141 is pressed from a gob of molten glass, by well-known equipment similar to that used to manufacture glass ashtrays. The flat surface of part 141, which mates with part 142, must generally be flat to within a few mils, and it may therefore be economical to flatten said surface by a grinding operation after the part is pressed, rather than by holding pressing tolerances this tight.

The pressing operation will generally be followed by an annealing operation, to remove residual strains in part 141.

The frusto-conical shape of cathode volume 153, and the trapezoidal cross section of connecting channel 152 have been specifically selected to provide for convenience in pressing and for effectiveness in distributing current over the cathode surface, but many other shapes and cross-sections are readily attainable, such range in selection being a particular virtue of the pressing manufacturing technique.

The laser bore 146, with its enlarged end sections 147, is now incised in part 142, using well-known equipment such as abrasive grinding wheels or abrasive end mills. Typical dimensions of the narrow-bore active section of bore 146 are 0.040 inch wide, 0.040 inch deep, and 6 inches long. The bottom of groove 146 may conveniently be rounded, rather than square, both to provide longer tool life and to reduce the fraction of the active gas volume which is outside the active lasing volume.

Alternatively, groove 146 may be slightly shallower than it is wide (e.g. 0.040 inch wide and 0.033 inch deep) so that the finished tubular region defined by assembling parts 141 and 142, with about 0.007 inch gap between them due to the presence of solder glass layer 143, will be more nearly equal in width and depth.

The enlargement of the end sections 147 of the laser bore is intended to avoid diffraction loss to the laser oscillation in the inactive regions of the laser bore. These sections may typically be made 0.080 inch wide and 0.06 inch deep. Corresponding sections 148 may now be incised in pressed part 141 (typically 0.020 inch deep and 0.080 inch wide), also for the purpose of reducing diffraction loss.

One specifically contemplated alternative manufacturing technique is that grooves 146, 147, and 148 may be manufactured by pressing, either by including the shapes of these parts in the original molds used to manufacture parts 141 and 142, or by subsequent manufacturing steps.

Another specifically contemplated alternative is that active laser bore 146 may be incised in part 141, rather than in part 142.

Yet another specifically contemplated alternative is that neither part 141 nor part 142 be incised to form bore 146, but rather that intermediate layer 143 be made thick enough so that the gap 164 in this layer can itself be the active bore.

After the manufacture of grooves 146, 147 and 148, it may be necessary to acid-polish these grooves, by well-known methods, so as to eliminate small surface defects which could lead to later breakage.

Holes are now drilled in pressed part 141 to provide entrances for anode 149 and tubulation 144, as well as to provide anode volume 151. This hole-drilling step may need to be followed by acid-polishing, as with the other machining steps described above. Alternatively, the necessary holes may have been provided as part of the original pressing operation.

One specifically contemplated alternative is that one or both of these holes may be drilled not into the pressed part 141, but into the corresponding locations in flat part 142.

The entrance hole for tubulation 144 is shown at a particularly preferred location which is in the entrance channel 152. A virtue of this particular location is that during the processing of the laser on a processing station, it permits a discharge to be struck from the cathode, through tubulation 144, to an auxiliary electrode (not shown) on the processing station, without the discharge having to pass through the laser bore 146. If this auxiliary electrode discharge were required to pass through the laser bore, it would be limited in magnitude, because of the susceptibility of the small laser bore to thermal breakage at high current densities. The entrance of tubulation 144 at connecting channel 152 permits higher currents to be used, because the small bore is avoided. This increased current density may permit more effective cleaning or oxidation of the cathode.

A second virtue of the shown entry position of tubulation 144 is that the discharge enters the cathode with almost the same density distribution that it would have if it ran through the laser bore to the laser anode. Thus, if a discharge in oxygen is run between the cathode and an auxiliary electrode, those areas of cathode metallizations 154 and 155 which would experience high current densities in the finished laser will experience high current densities in the auxiliary discharge, and will therefore tend to develop thicker or more insulative oxide layers. The effect of such oxide development will be to reduce the current densities in these potentially high-density areas, and hence, by contributing to the more even distribution of discharge current in the finished laser, to prolong the life of the laser in operation.

Notwithstanding the above comments, it will be clear to one skilled in the art that, for purposes of evacuation and gas filling, the hole for entrance of tubulation 144 may be located almost anywhere on the device.

Both parts 141 and 142 are now thoroughly cleaned, to remove grinding debris and chemical contaminants, by well-known methods. These parts are then placed in a sputtering or thermal evaporation coating system, along with appropriate masks, and the metallized areas are applied. Although a chrome-aluminum metallization has been described, it should be understood that a wide variety of conductive materials may be suitable. For example, in a laser designed to be used or processed at high temperature, it might be desirable to use a refractory metal such as tantalum for the cathode.

It should also be understood, although two "thin-film" processes have been specifically suggested for the application of the metallization, other techniques are applicable. For example, the conductive material could be settled from a solution or slurry, or it might be applied as a foil or sheet-metal insert conformal with the walls of cathode volume 153.

Conductive extensions 158 and 159 are next applied, for example by screen printing.

The mating surfaces of parts 141 and 142 are screen-printed with an appropriate solder glass, by methods well known in the art, and the solder glass is "burned-out" to remove solvents and partially sinter the glass frit, at a temperature appropriate to the chosen sealant.

Tubulation 144 and anode pin 149 are placed in their holes in part 141 and solder glass beads 145 and 150 are slipped in place. These may be burned-out preforms or paste-like suspensions of glass frit in a vehicle. The plates 141 and 142 are held together in an appropriate fixture, and the whole assembly is heated to a high enough temperature to soften the solder-glass frit and effect a gas-tight seal.

Depending on the mirror-mounting technique to be used, it may now be necessary to machine accurate faces on the ends of the assembled laser envelope, where the mirrors are to be mounted. If this is done, appropriate measures must be taken to keep grinding debris out of the laser bore, for example by applying a positive pressure of dry nitrogen through tubulation 144.

Mirrors 160 and 161 are mounted and aligned, for example by use of the FIG. 13 system. For a helium-neon laser, typical reflectivities and radii might be R=99.9%, r—∞ for mirror 160, and R=99.0%, r=30 cm for mirror 161. Other reflectivities and radii are of course possible.

After the mirrors are aligned, and sealed vacuum-tight, the laser is mounted on a processing station, and by evacuation at high temperature, combined optionally with a sequence of gas discharges in successive fillings of gases, the impurities in the laser are removed. An appropriate gas filling, such as 3 Torr of a 7-to-1 mixture of $He^3$ to $Ne^{20}$, is then placed in the laser, and tubulation 144 is "tipped-off" with a torch or other heat source. Such cleaning and gas-processing methods are well-known.

The laser may now be "aged" or "burned-in" by application of specific currents or voltages for specific periods of time (a variety of such processing schedules are possible). For example 10 milliamperes of current may be run through the laser for 24 hours. The purpose of such a cycle is to complete, by cataphoretic action, the removal of impurities from the device, and otherwise to stabilize its performance. This completes the manufacture of the device.

We claim:

1. In a gaseous laser device comprising an envelope, a cathode volume having at least one wall, an electrically conductive, relatively large surface area cathode within said cathode volume, a lasing volume, an anode, and means for igniting a gaseous discharge between the anode and the cathode, and wherein the cathode comprises an electrically conductive material supported by at least one cathode wall and wherein the cathode has at least one edge vulnerable to gas discharge deterioration, the improvement wherein a protective cover plate is juxtaposed over at least a portion of said vulnerable conductive edge of the cathode to substantially prevent gas discharge erosion of said cathode edge, without diminishing the effective cathode area.

2. The laser device of claim 1 wherein the electrically conductive cathode comprises at least one element or a conductive alloy of an element selected from the group consisting of Mg, Be, Ti, Zr, Hf, V, Nb, Ra, Cr, Mo, W, Mn, Tc, Re, Fe, Os, Rh, Ir, Ni, Pd, Pt, Cu, Ag, Au Zn, Cd, Hg, Al, Ga, In, Si, Ge, Sn, and Pb.

3. The laser device of claim 1 wherein the cathode comprises an evaporated thin film of aluminum.

4. The laser device of claim 1 wherein the cathode comprises a sputtered thin film of aluminum.

5. The laser device of claim 1 wherein the cathode volume has a frustoconical geometric shape.

6. In a gaseous discharge laser device comprising an envelope, a cathode volume being defined by at least two conjoined components and having at least one wall, an electrically conductive cathode within said cathode volume, a lasing gaseous volume, and an anode, the cathode comprising a layer of electrically conductive material supported by at least one cathode volume wall, said cathode having at least one edge vulnerable to gaseous discharge erosion, the improvement comprising the cathode-volume-defining components being conjoined so as to shield the cathode edge contained therein from the gaseous discharge and prevent gas discharge erosion of at least a portion of said vulnerable edge without diminishing the effective cathode area.

7. The laser device of claim 6 wherein the electrically conductive material comprises at least one member selected from the group consisting of the pure or conductive-alloy forms of Al, Ti, Be, Mg, Ni, Ta, and Zr.

8. The laser device of claim 6 wherein at least one of the conjoined cathode-volume defining components is pressed glass.

9. The laser device of claim 7 wherein the cathode comprises a sputtered thin film of aluminum.

10. The laser device of claim 9 wherein the cathode volume has a frustoconical geometric shape.

* * * * *